United States Patent
Kim et al.

(10) Patent No.: US 12,106,682 B2
(45) Date of Patent: Oct. 1, 2024

(54) CONTROL METHOD OF ELECTRONIC DEVICE FOR PROVIDING EVALUATION INFORMATION OF ESSAY AND COLLEGE ACCEPTANCE PROBABILITY

(71) Applicant: Collegenie AI, Hanam-Si (KR)

(72) Inventors: Kwang Il Kim, Seoul (KR); Keun Jin Kim, Seoul (KR)

(73) Assignee: Collegenie AI, Hanam-Si (KR)

( * ) Notice: Subject to any disclaimer, the term of this patent is extended or adjusted under 35 U.S.C. 154(b) by 0 days.

(21) Appl. No.: 18/049,807

(22) Filed: Oct. 26, 2022

(65) Prior Publication Data

US 2023/0126188 A1 Apr. 27, 2023

(30) Foreign Application Priority Data

Oct. 27, 2021 (KR) .......... 10-2021-0144099
Oct. 27, 2021 (KR) .......... 10-2021-0144100

(51) Int. Cl.
*G09B 7/02* (2006.01)
(52) U.S. Cl.
CPC ..................... *G09B 7/02* (2013.01)
(58) Field of Classification Search
CPC ........................................................ G07B 7/02
See application file for complete search history.

(56) References Cited

U.S. PATENT DOCUMENTS

| 5,344,326 A * | 9/1994 | Ferris ............... G09B 5/10 434/350 |
| 8,602,793 B1 * | 12/2013 | Sniedzins ............... G09B 5/00 434/323 |
| 10,276,055 B2 * | 4/2019 | Gustafson ............... G09B 7/02 |
| 10,353,720 B1 * | 7/2019 | Wich-Vila ............ G06F 3/04842 |

(Continued)

FOREIGN PATENT DOCUMENTS

| KR | 10-2020-0029975 A | 3/2020 |
| KR | 10-2020-0071878 A | 6/2020 |

(Continued)

OTHER PUBLICATIONS

An Office Action mailed by the Korean Intellectual Property Office on Jun. 14, 2023, which corresponds to Korean Patent Application No. 10-2021-0144099 and is related to U.S. Appl. No. 18/049,807.

(Continued)

*Primary Examiner* — Xuan M Thai
*Assistant Examiner* — Sadaruz Zaman
(74) *Attorney, Agent, or Firm* — Studebaker & Brackett PC

(57) ABSTRACT

Disclosed is a control method of an electronic device. The control method includes receiving an input of an essay written by a student with respect to at least one question, identifying an attribute value of the essay for each parameter by analyzing text constituting the essay, and displaying the text constituting the essay and displaying an indicator that emphasizes at least one sub-text related to the attribute value of the essay for each parameter within the displayed text, (Continued)

wherein a probability of acceptance is predicted by comparing award information and activity of the student with award information and activity information of successful applicants.

**18 Claims, 14 Drawing Sheets
(6 of 14 Drawing Sheet(s) Filed in Color)**

(56) References Cited

U.S. PATENT DOCUMENTS

| | | | | |
|---|---|---|---|---|
| 10,535,277 | B2* | 1/2020 | Apokatanidis | G09B 7/02 |
| 10,878,710 | B1* | 12/2020 | Shaw | G09B 5/00 |
| 10,957,212 | B2* | 3/2021 | Plant | G06N 3/042 |
| 11,062,387 | B2* | 7/2021 | Singh | G06Q 40/00 |
| 11,551,570 | B2* | 1/2023 | Crosta | G09B 7/02 |
| 11,580,427 | B2* | 2/2023 | Basiri | G06Q 50/2053 |
| 11,625,801 | B2* | 4/2023 | Low | G06Q 30/0206 |
| | | | | 705/328 |
| 11,630,905 | B2* | 4/2023 | Zhang | G06F 21/6245 |
| | | | | 726/27 |
| 11,714,967 | B1* | 8/2023 | Wu | G06N 5/01 |
| | | | | 704/9 |
| 11,756,444 | B2* | 9/2023 | Li | G06F 11/30 |
| 11,769,492 | B2* | 9/2023 | Kim | G10L 15/16 |
| | | | | 704/232 |
| 11,783,645 | B2* | 10/2023 | Olshansky | G06Q 10/1053 |
| | | | | 348/148 |
| 2002/0146676 | A1* | 10/2002 | Reynolds | G09B 5/00 |
| | | | | 434/362 |
| 2006/0115801 | A1* | 6/2006 | Ganley | G09B 7/02 |
| | | | | 434/219 |
| 2006/0199163 | A1* | 9/2006 | Johnson | G09B 5/00 |
| | | | | 434/322 |
| 2009/0226872 | A1* | 9/2009 | Gunther | G09B 7/00 |
| | | | | 434/350 |
| 2014/0011180 | A1* | 1/2014 | Tomaziefski | G09B 7/02 |
| | | | | 434/362 |
| 2014/0101068 | A1* | 4/2014 | Gidugu | G06Q 50/205 |
| | | | | 705/327 |
| 2015/0199913 | A1* | 7/2015 | Mayfield | G09B 7/02 |
| | | | | 434/353 |
| 2019/0150819 | A1* | 5/2019 | Charvat | G16H 50/30 |
| 2020/0184144 | A1* | 6/2020 | Bae | G06Q 10/105 |
| 2021/0097876 | A1* | 4/2021 | Rodriguez Bravo | G09B 7/00 |
| 2021/0150925 | A1* | 5/2021 | Birchfield | G09B 5/00 |
| 2022/0383767 | A1* | 12/2022 | Manoria | G09B 7/02 |
| 2023/0087817 | A1* | 3/2023 | Settles | G09B 7/10 |
| | | | | 434/157 |
| 2023/0222937 | A1* | 7/2023 | Lin | G09B 17/04 |

FOREIGN PATENT DOCUMENTS

| | | |
|---|---|---|
| KR | 10-2021-0023344 A | 3/2021 |
| KR | 10-2021-0050155 A | 5/2021 |
| KR | 10-2021-0077417 A | 6/2021 |

OTHER PUBLICATIONS

An Office Action mailed by the Korean Intellectual Property Office on Jun. 14, 2023, which corresponds to Korean Patent Application No. 10-2021-0144100 and is related to U.S. Appl. No. 18/049,807.

Lee Do-gil, "Analysis of self-introduction based on statistical text analysis," Research on National Culture, 2018, vol. 81, pp. 649-684, Korea University Research Institute of Ethnic Culture, <URL: https://www.kci.go.kr/kciportal/ci/sereArticleSearch/ciSereArtiView.kci?sereArticleSearchBean.artiId=ART00241284.

Hyunjoo Lee, "Visualization of school record document contents using text mining techniques," Ewha Womans University Graduate School of Education, 2019, pp. 1-72, <URL: https://dspace.ewha.ac.kr/handle/2015.oak/248962>.

Korea University—University Job Center, "University Job Center, Comment Tips on using the "AI self-introduction analyzer"," Naver Blog [online], May 20, 2020, <URL: https://blog.naver.com/kusejongcdc/221971126445>.

* cited by examiner

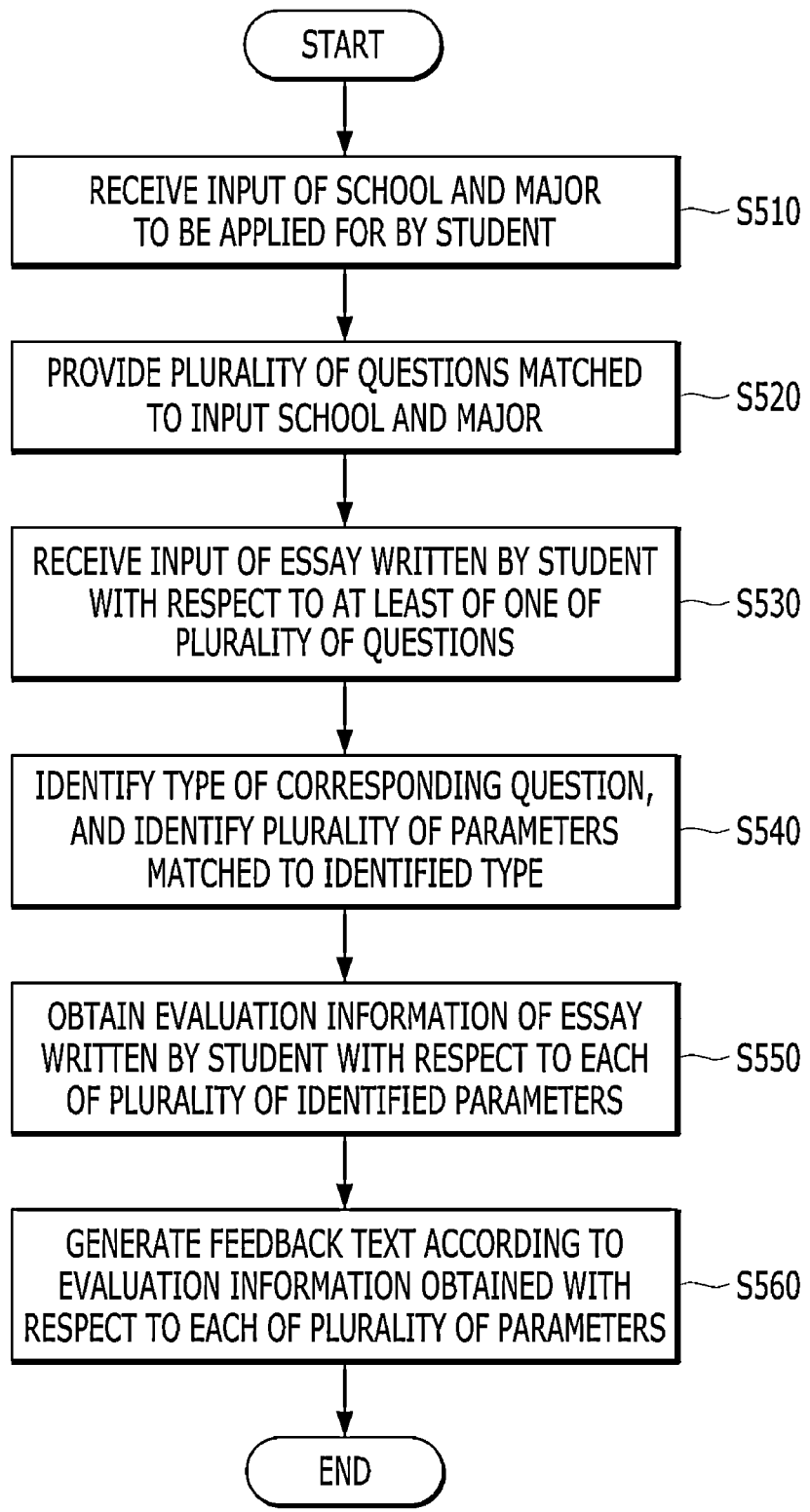

FIG. 6

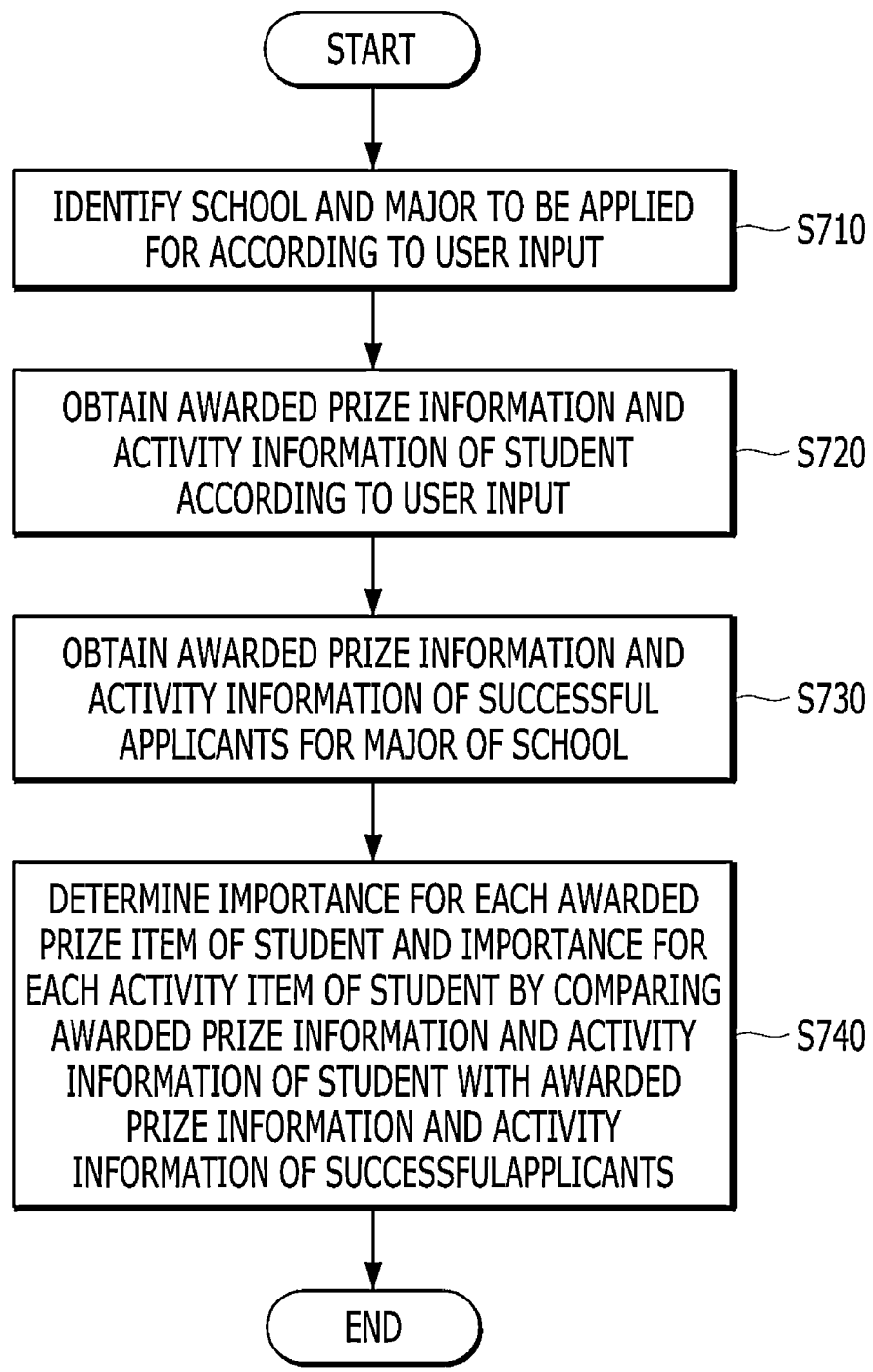

Award 1
Type your high school
Grade level
☑ 9  ☐ 10  ☐ 11  ☐ 12  ☐ Post-graduate
Level(s) of recognition
☐ School  ☐ State/Regional  ☐ National  ☐ International Award 2
Type your high school
Grade level
☑ 9  ☐ 10  ☐ 11  ☐ 12  ☐ Post-graduate
Level(s) of recognition
☐ School  ☐ State/Regional  ☐ National  ☐ International (2 of 5 available)

+ Add another award   - Delete award

< Back     Next >

320

Activity 1
Activity type

Position/Leadership description and organization name, if applicable

Please describe this activity, including what you accomplished and any recognition you received, etc.

Participation grade levels
☑ 9  ☐ 10  ☐ 11  ☐ 12  ☐ Post-graduate
Timing of participation
☐ During school year  ☐ During school break  ☐ All year
Hour spent per week Weeks spent per year (1 of 10 available)

+ Add another award   - Delete award

< Back     Next >

CONTROL METHOD OF ELECTRONIC DEVICE FOR PROVIDING EVALUATION INFORMATION OF ESSAY AND COLLEGE ACCEPTANCE PROBABILITY

CROSS-REFERENCE TO RELATED APPLICATION

This U.S. non-provisional patent application claims priority under 35 U.S.C. § 119 of Korean Patent Application Nos. 10-2021-0144099, filed on Oct. 27, 2021, and 10-2021-0144100, filed on Oct. 27, 2021, the entire contents of which are hereby incorporated by reference.

BACKGROUND

The present disclosure relates to an electronic device for providing evaluation information of an essay, and more particularly, to a control method of an electronic device, which provides evaluation information for an attribute value for each parameter by analyzing an essay written by a student, and predicts the probability of acceptance by comparing award information and activity information of the student with award information and activity information of successful applicants.

In the case of conventional university admission consultation, a correction function for an essay, focused on grammar or vocabulary, is provided, but it is often the case that the theme of an essay, relevance for each question, interest for each university, and the like, which are factors paid attention to by admission officers, cannot be evaluated.

In particular, in some countries, such as the United States, there is an increasing need for a holistic analysis solution due to a change in an SAT examination policy, and thus a solution capable of more professionally providing essay analysis is necessary.

Meanwhile, conventional systems merely provide evaluation information with a focus on a quantitative evaluation of a test score or grammar in an essay, whereas the importance of a qualitative evaluation of an essay, award/activity history, and the like increases in a university admission procedure.

Specifically, in the United States, the necessity of an existing quantitative evaluation solution has decreased due to a change in the SAT examination policy. Furthermore, the average price for university admission consultation of individual experts is from 5,000 dollars to almost 20,000 dollars, giving not a little burden on students entering into an admission process.

Therefore, a holistic analysis solution capable of professionally providing an analysis of an essay or an evaluation of an award/activity history is necessary.

SUMMARY

The present disclosure discloses a control method of an electronic device, which recognizes characters, background, and conflicting entities that are essential elements of a story so as to assist with comparison analysis with essay patterns of admitted students and intent of a question.

The present disclosure provides a control method of an electronic device, which visually/intuitively provides, on text, an attribute value of an essay for each parameter.

The present disclosure provides a control method of an electronic device, which collects data of successful applicants for a university and major to be applied for and compares award and activity histories of a student to provide evaluation information.

The present disclosure provides a specific control method of an electronic device, which uses a sequential keyword-based comparison scheme according to a name and description of each item when comparing award information and activity information included in data of successful applicants with award information and activity information of a student.

A control method of an electronic device according to an embodiment of the present disclosure includes receiving an essay written by a student with respect to at least one question as input, identifying an attribute value of the essay for each parameter by analyzing text constituting the essay, and displaying the text constituting the essay and displaying an indicator that emphasizes at least one sub-text related to the attribute value of the essay for each parameter within the displayed text.

In the displaying of the indicator, when at least one parameter is selected, the indicator that emphasizes a sub-text related to an attribute value of the selected parameter may be displayed.

In this case, the control method may further include displaying, when the indicator is selected, attribute information of the sub-text related to the attribute value of the selected parameter.

Furthermore, in the displaying of the indicator, a plurality of indicators that respectively emphasize a plurality of sub-texts may be differentially displayed according to attribute information.

The control method of may further include receiving a school and major to be applied for by the student as input, analyzing an essay of each of successful applicants for the major of the school to identify an attribute value for each parameter with respect to the essay of each of the successful applicants, displaying, when at least one parameter is selected, a graphic user interface (GUI) that visualizes ratio information of the successful applicants with respect to each attribute value related to the selected parameter, and displaying, in the GUI, an indicator indicating a point matched to the attribute value of the essay written by the student.

In this case, the control method may further include receiving an attribute value for each parameter intended by the student with respect to the essay as input, displaying, in the GUI, an indicator indicating a point matched to the attribute value intended by the student, and displaying comparison information about a comparison between the attribute value of the essay written by the student and the attribute value intended by the student.

A control method of an electronic device according to an embodiment of the present disclosure includes receiving a school and major to be applied for by a student as input, providing a plurality of questions matched to the major of the school, receiving an essay written by the student with respect to at least question among the plurality of questions as input, identifying a type of the at least one question and identifying a plurality of parameters matched to the identified type, obtaining evaluation information of the essay written by the student with respect to each of the plurality of parameters identified, and generating feedback text according to the evaluation information obtained for each of the plurality of parameters.

In this case, the obtaining of the evaluation information of the essay written by the student may include extracting a plurality of keywords from text constituting the essay written by the student, converting each of the plurality of keywords into a vector form and identifying relevance between the plurality of keywords according to a distance between converted vectors, and obtaining the evaluation information about an originality parameter according to the identified relevance.

Furthermore, the obtaining of the evaluation information of the essay written by the student may include extracting a plurality of keywords from text constituting the essay written by the student, performing a search from a web with respect to each of the plurality of keywords, selecting at least one unique keyword from among the plurality of keywords according to a search frequency of each of the plurality of keywords, and obtaining the evaluation information about a topic uniqueness parameter based on a frequency of appearance of the unique keyword in the essay written by the student.

A control method of an electronic device for predicting a probability of acceptance according to award information and activity information, according to an embodiment of the present disclosure, includes identifying a school and major to be applied for according to a user input, obtaining award information and activity information of a student according to the user input, obtaining award information and activity information of successful applicants for the major of the school, and determining importance for each award item of the student and importance for each activity item of the student by comparing the award information and activity information of the student with the award information and activity information of the successful applicants.

In this case, the determining of the importance may include identifying whether an award item of the successful applicants matched to the award item of the student is present by comparing the award item of the student included in the award information of the student with each of award items included in the award information of the successful applicants, setting first importance of the award item of the student based on whether the award item of the successful applicants matched to the award item of the student is present, identifying whether an activity item of the successful applicants matched to the activity item of the student is present by comparing the activity item of the student included in the activity information of the student with each of activity items included in the activity information of the successful applicants, and setting first importance of the activity item of the student based on whether the activity item of the successful applicants matched to the activity item of the student is present.

Furthermore, in the identifying whether the award item of the successful applicants matched to the award item of the student is present, a name of the award item of the student may be compared with a name of each of the award items of the successful applicants using a latent Dirichlet allocation (LDA) topic extraction scheme, and a description of the award item of the student may be compared with a description of each of the award items of the successful applicants using the LDA topic extraction scheme, and in the identifying whether the activity item of the successful applicants matched to the activity item of the student is present, a name of the activity item of the student may be compared with a name of each of the activity items of the successful applicants using the LDA topic extraction scheme, and a description of the activity item of the student may be compared with a description of each of the activity items of the successful applicants using the LDA topic extraction scheme.

Meanwhile, the determining of the importance may include calculating relevance of the award item of the student to the award information of the successful applicants by comparing the award item of the student with each of the award items included in the award information of the successful applicants when the award item of the successful applicants matched to the award item of the student is not present, and setting the first importance of the award item of the student according to the relevance of the award item of the student.

In this case, in the calculating of the relevance of the award item of the student, first relevance may be calculated by comparing a name of the award item of the student with a name of each of the award items of the successful applicants using a term frequency-inverse document frequency (TF-IDF) scheme, second relevance may be calculated by comparing a description of the award item of the student with a description of each of the award items of the successful applicants using the TF-IDF scheme, and the relevance of the award item of the student may be calculated based on a larger value among the first relevance and the second relevance.

Meanwhile, the determining of the importance may include calculating relevance of the activity item of the student to the activity information of the successful applicants by comparing the activity item of the student with each of the activity items included in the activity information of the successful applicants when the activity item of the successful applicants matched to the activity item of the student is not present, and setting the first importance of the activity item of the student according to the relevance of the activity item of the student.

Furthermore, in the calculating of the relevance of the activity item of the student, third relevance may be calculated by comparing a name of the activity item of the student with a name of each of the activity items of the successful applicants using a TF-IDF scheme, fourth relevance may be calculated by comparing a description of the activity item of the student with a description of each of the activity items of the successful applicants using the TF-IDF scheme, and the relevance of the activity item of the student may be calculated based on a larger value among the third relevance and the fourth relevance.

Meanwhile, the determining of the importance may include setting second importance according to a prestige score and a major fit score for each award item of the student, and setting second importance according to a dedication score, a leadership score, a description score, and a major fit score for each activity item of the student.

Furthermore, in the determining of the importance, the importance for each award item of the student may be determined based on the first importance and the second importance set for each award item of the student, and the importance for each activity item of the student may be determined based on the first importance and the second importance set for each activity item of the student, and the control method may further include generating prediction information related to acceptance of the student for the major of the school using the importance for each award item of the student and the importance for each activity item of the student.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Exemplary embodiments can be understood in more detail from the following description taken in conjunction with the accompanying drawings, in which:

FIG. 3 is a diagram illustrating a UI that an electronic device according to an embodiment of the present disclosure provides to receive an input of an essay written by a student and an attribute value intended by the student;

FIG. 4B is a diagram illustrating a UI through which an electronic device according to an embodiment of the present disclosure provides evaluation information about an attribute value of an essay for a Character parameter;

FIG. 5 is a flowchart for describing an operation of an electronic device according to an embodiment of the present disclosure for providing evaluation information of an essay for a plurality of parameters identified according to a school and major to be applied for;

FIG. 6 is a diagram illustrating a UI that an electronic device provides according to the embodiment of FIG. 5;

FIG. 7 is a flowchart for describing operation of an electronic device according to an embodiment of the present disclosure;

FIG. 8 is a diagram for describing a user interface (UI) that an electronic device provides to receive an input of award information and activity information according to an embodiment of the present disclosure;

DETAILED DESCRIPTION OF EMBODIMENTS

Figure 1:
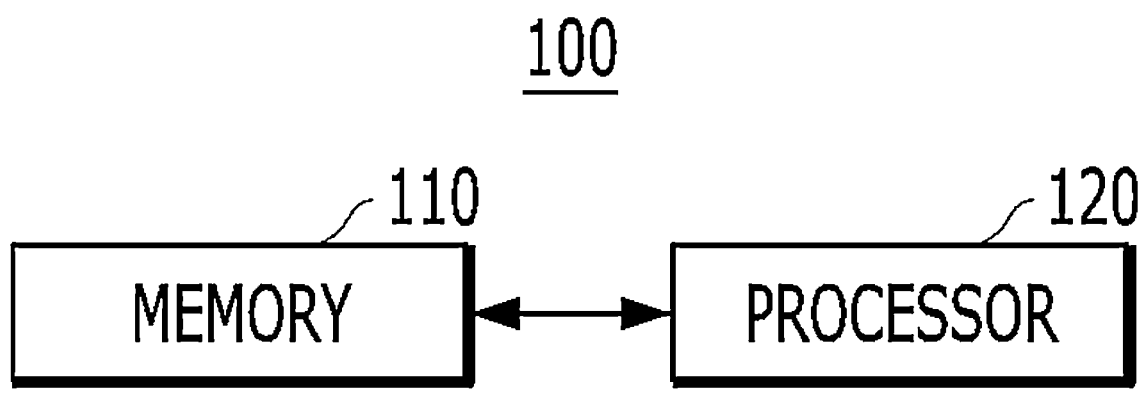
FIG. 1 is a block diagram for describing a configuration of an electronic device according to an embodiment of the present disclosure.

Description methods of the present description and drawings will be described before specifically describe the present disclosure.

First, regarding the terminology used in the present description and claims, general terms were selected in consideration of functions in various embodiments of the present disclosure. However, such terms may be changed according to the intent or legal or technical interpretation of a person skilled in the relevant technical field or the advent of new technology. Furthermore, some terms were arbitrarily selected by the applicant. Such terms may be interpreted as the meaning defined in the present description, or may be interpreted based on overall contents of the present description and common technical knowledge in the relevant technical field if there is no specific definition of such terms.

Furthermore, the same reference numerals or signs shown in the accompanying drawings refer to components or elements that perform substantially the same function. The same reference numerals or signs are used in different embodiments in order to provide descriptions with ease and assist with understanding. That is, even if elements having the same reference numeral are all illustrated in a plurality of drawings, the plurality of drawings should not be construed as representing one embodiment.

Furthermore, terms including ordinal numbers such as "first", "second", and the like may be used to differentiate elements in the present description and claims. Such ordinal numbers are used to differentiate the same or similar elements, and should not be construed as limiting the meanings of terms. For example, an element combined with an ordinal number should not be limited by the number in terms of the order of usage or the order of arrangement. Ordinal numbers may be interchangeably used as necessary.

In the present description, singular forms are intended to include the plural forms as well, unless the context clearly indicates otherwise. It will be further understood that the terms "comprise", "comprising,", "include", "including", and/or "configured", when used herein, specify the presence of stated features, numbers, steps, operations, elements, components or combinations thereof, but do not preclude the presence or addition of one or more other features, numbers, steps, operations, elements, components or combinations thereof.

The terms "module", "unit", "part", and the like used in the embodiments of the present disclosure are used to refer to an element for performing at least one function or operation, and such an element may be implemented as hardware or software or a combination thereof. Furthermore, a plurality of "modules", "units", or "parts" may be implemented as at least one processor by being integrated as at least one module or chip unless the plurality of "modules", "units", or "parts" are each required to be implemented as individual particular hardware.

Furthermore, in the embodiments of the present disclosure, when a certain portion is referred to as being connected to another portion, this connection indicates not only a direct connection but also an indirection connection through another medium. Furthermore, when it is mentioned that a certain portion includes a certain element, the certain portion may further include other elements, unless otherwise specified.

Hereinafter, various embodiments of the present invention will be described in detail with reference to the accompanying drawings.

FIG. 1 is a block diagram for describing a configuration of an electronic device according to an embodiment of the present disclosure.

Referring to FIG. 1, an electronic device 100 may include a memory 110 and a processor 120.

The electronic device 100 may be implemented as a server including at least one computer. In this case, the electronic device 100 may communicate with external devices using various communication schemes. In detail, the electronic device 100 may be connected to terminal devices of various users through at least one application or web page to perform control methods according to various embodiments that will be described later.

Furthermore, the electronic device 100 may correspond to various terminal devices such as smartphone, tablet PC, notebook PC, desktop PC, PDA, wearable device, etc.

The memory 110 is configured to store an operating system (OS) for controlling overall operation of elements of the electronic device 100 and at least one instruction or data related to the elements of the electronic device 100.

The memory 110 may include a non-volatile memory such as a ROM, flash memory, and the like, and may include a volatile memory configured with a DRAM or the like. Furthermore, the memory 110 may also include a hard disk, a solid state drive (SSD), and the like.

The memory 110 may include at least one artificial intelligence model used in the various embodiments that will be described later, wherein the artificial intelligence model may be a model trained using supervised learning, unsupervised learning, reinforcement learning, or the like. The artificial intelligence model may correspond to a neural network model, which is trained by being updated according to a weight between nodes included in different layers.

The processor 120 is configured to control overall configuration and operation of the electronic device 100.

The processor 120 may be connected to the memory 110 to control the electronic device 100 by executing at least one instruction stored in the memory 110.

To this end, the processor 120 may be implemented as a general-purpose processor such as a central processing unit (CPU), an application processor (AP), or the like, a dedicated graphics processor such as a graphic processing unit (GPU), a vision processing unit (VPU), or the like, or a dedicated artificial intelligence processor such as a neural processing unit (NPU) or the like. The processor 120 may include a volatile memory such as an SRAM or the like.

Meanwhile, although not illustrated, the electronic device 100 may further include a communication unit for communicating with at least one external device.

The communication unit may be connected to an external server and/or terminal device via at least one network, and may exchange data using various wired/wireless communication schemes.

The network may be a personal area network (PAN), a local area network (LAN), a wide area network (WAN), or the like according to an area or scale or may be an intranet, extranet, Internet, or the like according to network openness.

The wireless communication may include at least one of communication schemes such as long-term evolution (LTE), LTE advance (LTE-A), 5th generation (5G) mobile communication, code division multiple access (CDMA), wideband CDMA (WCDMA), universal mobile telecommunications system (UMTS), wireless broadband (WiBro), global system for mobile communications (GSM), time division multiple access (DMA), Wi-Fi (WiFi), WiFi direct, Bluetooth, near field communication (NFC), and Zigbee.

The wired communication may include at least one of communication schemes such as Ethernet, optical network, universal serial bus (USB), and Thunderbolt.

Meanwhile, the communication schemes are not limited to the above-mentioned examples, and may further include new communication schemes with the development of technology.

The electronic device 100 may obtain student information according to a user input, and may identify a school and major to be applied for by a student according to the user input.

The user input may be received through a user input unit (e.g., touch screen, button, microphone, or camera (motion recognition unit)) included in the electronic device 100. Alternatively, in the case where the electronic device 100 is a server, the user input may be received through at least one terminal device connected to the electronic device 100.

For example, the electronic device 100 may perform member registration to a platform provided by the electronic device 100 through a process of receiving student information including a name, age, contact number, and the like of a student. In this case, an ID and password linked to the student information may be generated.

Furthermore, in a state in which a particular student has logged in, a school and major to be applied for by the student may be input to the electronic device 100. Alternatively, the school and major to be applied for by the student may be input during a member registration process.

Furthermore, in a state in which a particular student has logged in, the electronic device 100 may receive an essay written by the student as an input.

Figure 2:
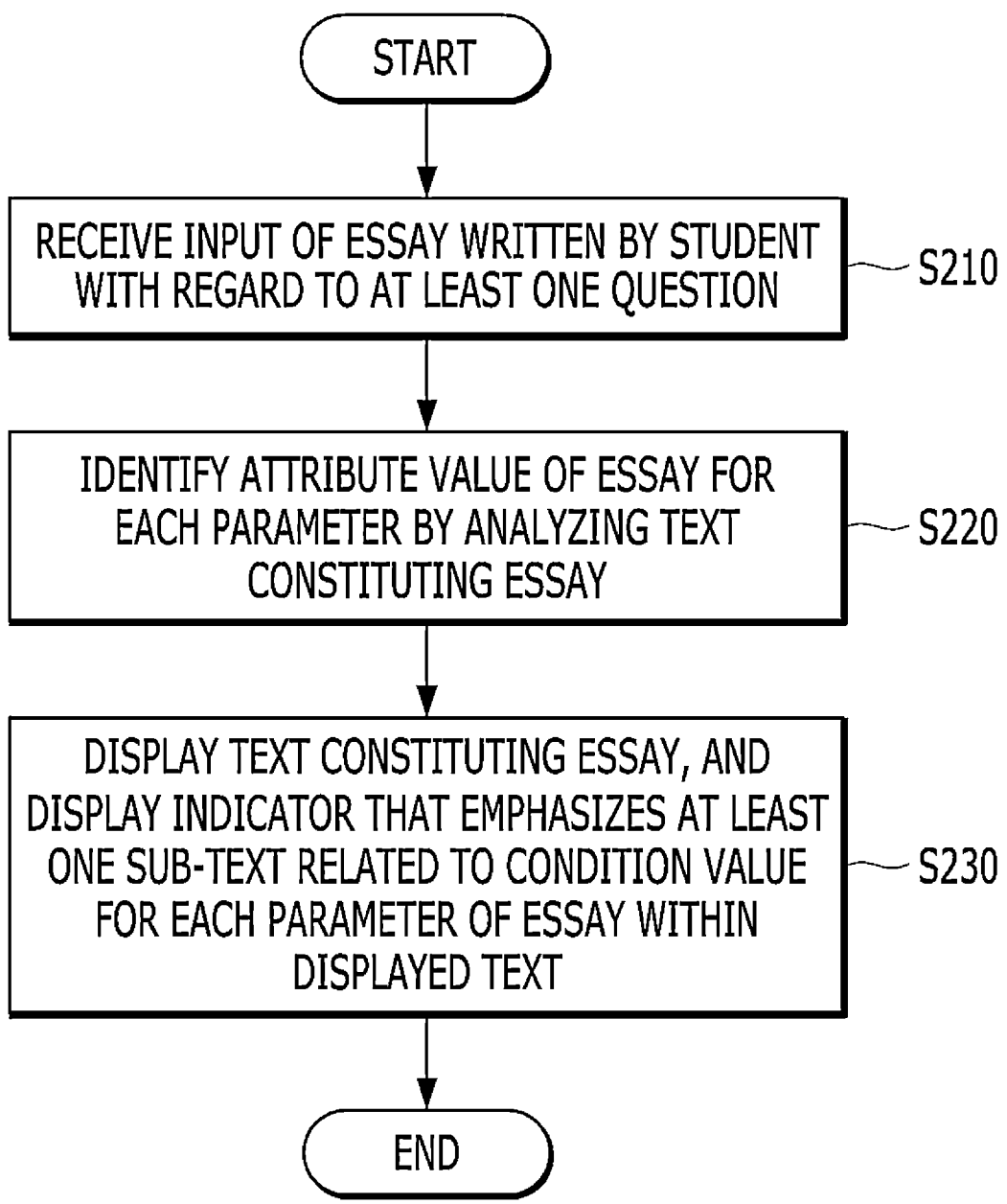
FIG. 2 is a flowchart for describing a control method of an electronic device according to an embodiment of the present disclosure.

FIG. 2 is a flowchart for describing a control method of an electronic device according to an embodiment of the present disclosure.

Referring to FIG. 2, the electronic device 100 may receive an essay written by a student with regard to at least one question (S210).

The electronic device 100 may provide a question through a display/speaker of the electronic device 100 or a display/speaker of at least one terminal device (e.g., smartphone, tablet PC) connected to the electronic device 100.

The question is related to an essay for admission to at least one university/major, and may correspond to a query about admission motivation, growth background, various experiences, values, etc. of an applicant (student), but is not limited thereto.

The electronic device 100 may receive an input of an essay through a user input unit (e.g., keypad, keyboard device, microphone, etc.) provided to the electronic device 100. Alternatively, in the case where the electronic device 100 is implemented as a server, an essay may be uploaded on the electronic device 100 through at least one terminal device connected to the electronic device 100.

Here, the electronic device 100 may receive an input of text constituting the essay.

The electronic device 100 may identify an attribute value of the essay for each parameter by analyzing the input text constituting the essay (S220). The electronic device 100 may analyze the text using various natural language processing techniques.

The parameter may include Theme/Mood, Character, Setting, "Plot & Conflict", Writing Quality, "Showing vs Telling", etc., but other various elements for representing an attribute or flow of an essay may also be set and used as at least one parameter.

The Theme/Mood parameter is a parameter pertaining to an overall emotion or mood included in the essay. The Theme/Mood parameter may correspond to various attribute values such as 'joyful', 'sad', 'calm', 'suspenseful', 'disturbed', etc. An attribute value that may be set for the Theme/Mood parameter may be differently defined according to a previously provided question.

For example, when the question related to the essay corresponds to a query about an application motivation, the electronic device 100 may determine an attribute value of the essay for the Theme/Mood parameter as at least one of 'curiosity', 'desire', 'excitement', or 'pride'. On the contrary, when the question related to the essay corresponds to a query about a growth background, the electronic device 100 may determine an attribute value of the essay for the Theme/Mood parameter as 'joyful', 'sad', 'calm', 'caring', 'realization', etc.

In an embodiment, the electronic device 100 may extract a plurality of keywords related to an emotion or mood from the text constituting the essay.

In this case, the electronic device 100 may identify each keyword using at least one artificial intelligence model trained to extract a keyword corresponding to an emotion or mood.

Furthermore, the electronic device 100 may classify an emotion/mood of each keyword extracted from the text or a sentence in which each keyword is included. In this case, at least one artificial intelligence model (e.g., classifier model) may be used, which is trained to classify an emotion/mood when at least one sub-text is input.

Alternatively, the electronic device 100 may extract a topic by analyzing the sentence in which each keyword is included, using a latent Dirichlet allocation (LDA) scheme. Here, at least one artificial intelligence model may be used, which is trained to classify a topic (emotion/mood) through sentences corresponding to various emotions or moods.

Furthermore, the electronic device 100 may determine an attribute value corresponding to an overall emotion/mood of the essay according to a ratio or frequency of each of keywords respectively corresponding to emotions or moods. In this case, the electronic device 100 may identify the emotion or mood of the essay by analyzing the frequency of each keyword using a term frequency-inverse document frequency (TF-IDF) scheme.

Here, the electronic device 100 may determine an attribute value of the Theme parameter of the essay according to an emotion/mood of keywords that most dominantly and frequently appear.

The Character parameter is a parameter pertaining to characters appearing in the essay.

An attribute value of the Character parameter may be determined according to which character is mainly focused on in the essay. For example, an attribute value of the Character parameter may be determined as 'Mostly me', 'Me some others', 'other characters', etc. The 'Mostly me' indicates the case in which an appearance ratio of an essay writer ('you') is relatively high, the 'Other characters' indicates the case in which an appearance ratio of characters other than the essay writer is relatively high, and the 'Me some others' indicates an intermediate case between the above two cases. However, the attribute value of the Character parameter may also be defined as an appearance frequency of characters classified according to other criteria such as friend, parents, etc. aside from the appearance frequency of characters classified simply as 'you' (writer) and 'others' (other people) as described above.

In an embodiment, the electronic device 100 may extract a plurality of keywords related to a character from the text constituting the essay.

In this case, the electronic device 100 may identify each keyword using at least one artificial intelligence model trained to extract a keyword corresponding to a character.

Furthermore, the electronic device 100 may classify each keyword extracted from the text as a corresponding character (e.g., you (writer), others). In this case, at least one artificial intelligence model may be used, which is trained to identify, when at least one word is input, a character represented by the input word.

Furthermore, the electronic device 100 may determine overall appearance frequencies of characters of the essay according to a ratio or frequency of each of keywords respectively corresponding to the characters.

Here, the electronic device 100 may determine the attribute value of the Character parameter according to an attribute of a character which most frequently appears.

The Setting parameter is a parameter pertaining to strength/detailedness of descriptions of a location, background, time, etc. included in the essay.

The Setting parameter may correspond to, for example, an attribute value such as 'Heavy emphasis on setting', 'Moderate emphasis on setting', 'Setting is not a big factor', etc., but is not necessarily limited thereto. An attribute value of the Setting parameter may be separately defined for each of location, time, and movement.

In an embodiment, the electronic device 100 may extract a plurality of keywords related to at least one of location, time, or movement from the text constituting the essay.

Furthermore, the electronic device 100 may identify at least one sentence modifying each of keywords related to location, time, and movement.

To this end, the electronic device 100 may use at least one recurrent neural network (RNN)-based artificial intelligence model trained to recognize a relationship (e.g., parallel relationship, modifying relationship, continuous relationship, etc.) between sequentially continuous sub-texts (e.g., words, sentences).

Here, the electronic device 100 may identify the strength of Setting according to keywords related to location, time, and movement in the essay and a ratio/frequency of a modifying sentence, and may determine an attribute value according to the identified strength of Setting. For example, the electronic device 100 may calculate an average value of the strength of Setting related to the location, the strength of Setting related to the time, and the strength of Setting related to the movement, and thereafter may determine the attribute value (strength of Setting) according to the calculated average value.

The Plot & Conflict parameter is a parameter pertaining to an overall story flow such as a reversal of a mood or content according to an emotion or plot in the essay.

An attribute value of the Plot & Conflict parameter, for example, may be defined according to a frequency of a word or action verb related to Conflict. Furthermore, the Plot & Conflict parameter may be defined as an attribute value such as frequentness, occasional occurrence, or rare occurrence of emotional ups and downs according to a change in an emotion or flow. Furthermore, the attribute value (e.g., small/large number of characters) of the Plot & Conflict parameter may be defined according to the number of all characters in the essay.

In an embodiment, the electronic device 100 may identify overall complexity of a plot according to the number of characters in the essay, the number/frequency of words related to Conflict, and the number/frequency of words/sentences related to Setting. In this case, the electronic device 100 may determine an attribute value of the essay for the Plot & Conflict parameter according to the identified complexity.

Furthermore, the electronic device 100 may identify the number/frequency of words related to Conflict in the essay to determine the same as the attribute value of the Plot & Conflict parameter.

Furthermore, the electronic device 100 may divide the text constituting the essay into a plurality of sections, may recognize a change in a word and/or emotion related to Conflict for each of the divided sections, and may determine the attribute value according to how overall development of the essay progresses.

The Writing Quality parameter is a parameter corresponding to quality (clarity, grammar, etc.) of each of sentences in the essay.

An attribute value (e.g., superb, strong, good, mediocre, weak) of the Writing Quality parameter may be determined with regard to each of Correctness, Writing Diversity, Readability, and Clarity.

For example, the electronic device 100 may convert an attribute value for Correctness into a score or the like by determining grammar correctness of each of sentences in the essay using at least one grammar checking algorithm/logic.

Furthermore, the electronic device 100 may convert an attribute value for Writing Diversity into a score or the like according to the number/frequency of words (e.g., TF-IDF based extraction) that are not used generally.

Furthermore, the electronic device 100 may identify an attribute value related to Readability using an index such as Gunning fog, Flesch-Kincaid, simple measure of gobbledygook (SMOG), etc.

Furthermore, the electronic device 100 may calculate an attribute value for Clarity according to the number of words in each sentence in the essay, more specifically, the number of words corresponding to each of transition, noun, and passive voice in each sentence.

"Showing vs Telling" is a parameter corresponding to a ratio relationship between showing sentences and detailed sentences.

An attribute value of the "Showing vs Telling" parameter may be defined according to a ratio between showing or representative sentences and telling sentences.

In an embodiment, the electronic device 100 may extract each of an showing sentence and a telling sentence from the text constituting the essay.

In detail, a sentence including at least one of a strong verb or an uncommon adjective may be identified as an showing sentence, and a sentence including at least one of a static/stative verb or a common adjective may be identified as a telling sentence. Here, whether each verb/adjective is general (static/stative/common) or uncommon (strong) may be defined in advance in at least one database (e.g., lexicon) including information about each of general verbs/adjectives and uncommon verbs/adjectives.

In detail, the electronic device 100 may input each sentence to an artificial intelligence model trained to determine an attribute (e.g., showing sentence vs telling sentence). In this case, the artificial intelligence model may determine an attribute of each sentence by comparing each of words included in a pre-stored lexicon with each verb/adjective in a sentence.

Furthermore, the electronic device 100 may determine an attribute value for the "Showing vs Telling" parameter according to a ratio between showing sentences and telling sentences.

When attribute values related to various parameters are determined as described above, the electronic device 100 may provide a visual user interface (UI) that emphasizes at least one sub-text related to each attribute value in the text constituting the essay (S230).

The electronic device 100 may provide the above-described text (essay) and an indicator through a display provided to the electronic device 100 or a display of at least one terminal device connected to the electronic device 100.

In detail, while displaying the text constituting the essay, the electronic device 100 may display an indicator that emphasizes at least one sub-text related to an attribute value for each parameter of the essay in the displayed text. Relevant detailed descriptions will be provided later with reference to FIGS. 4A to 4D.

Figure 3:
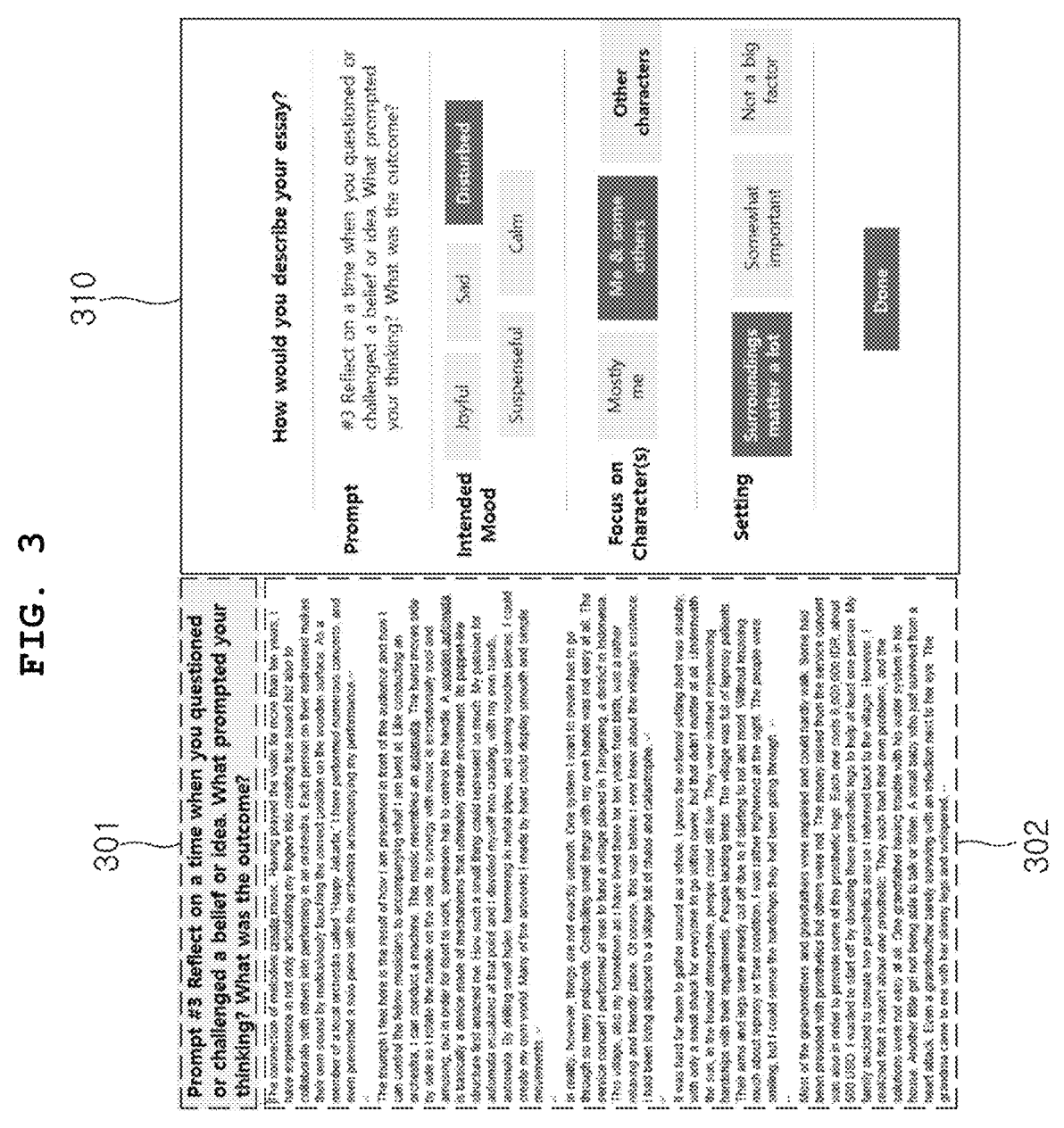

FIG. 3 is a diagram illustrating a UI that an electronic device according to an embodiment of the present disclosure provides to receive an input of an essay written by a student and an attribute value intended by the student.

Referring to FIG. 3, the electronic device 100 may provide at least one question 310 related to a university and major to be applied for by the student. The question 301, for example, may be a question previously given in an admission process of the university and major to be applied for by the student, but is not limited thereto.

Furthermore, the electronic device 100 may display an essay 302 received according to a user input. In detail, text constituting the essay 302 may be displayed.

Furthermore, the electronic device 100 may provide a UI 310 for receiving an input of an attribute value for each parameter intended by the student with regard to the essay 302.

An attribute value for each parameter (Mood, Character, Setting) intended by the student with regard to the essay 302 may be selected through the UI 310.

Here, the electronic device 100 may analyze the essay 302 written by the student to determine the attribute value for each parameter as in the above-mentioned various embodiments.

Furthermore, the electronic device 100 may analyze essays of successful applicants for a school and major to be applied for by the student to identify the attribute value for each parameter with respect to each of the essays of the successful applicants.

Furthermore, the electronic device 100 may provide evaluation information as shown in FIGS. 4A to 4D by comparing and analyzing the attribute value for each parameter of the essay 302 written by the student, the attribute value for each parameter of the essays written by the successful applicants, and the attribute value (e.g., FIG. 3) for each parameter intended by the student.

Figure 4A:
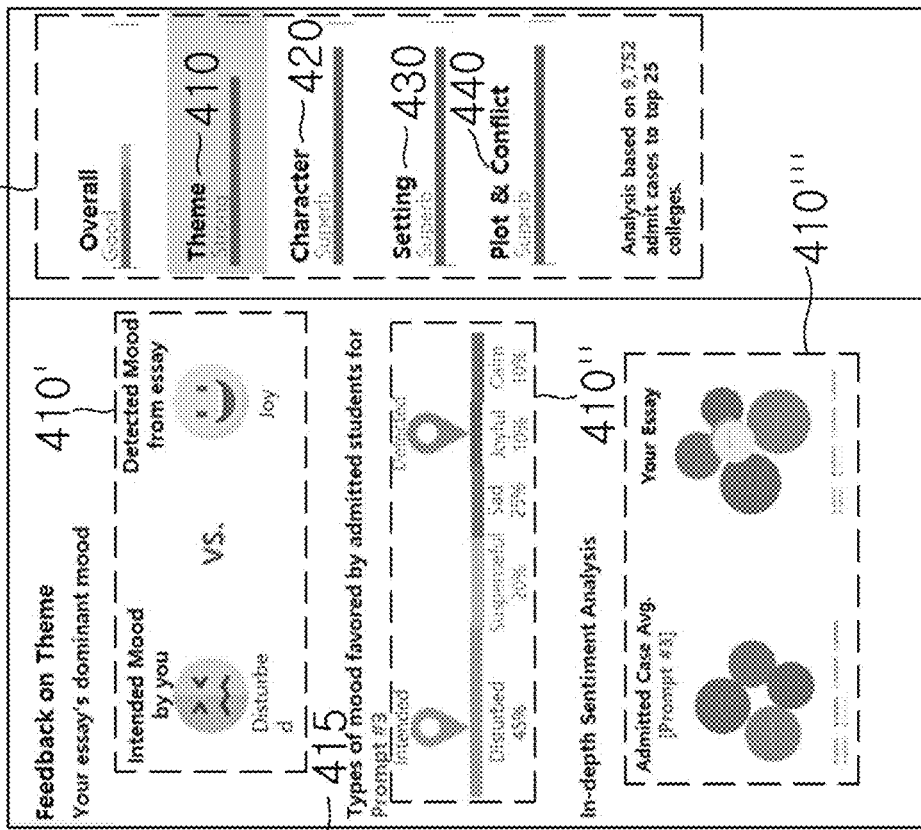
FIG. 4A is a diagram illustrating a UI through which an electronic device according to an embodiment of the present disclosure provides evaluation information about an attribute value of an essay for a Theme parameter.

FIG. 4A is a diagram illustrating a UI through which an electronic device according to an embodiment of the present disclosure provides evaluation information about an attribute value of an essay for the Theme parameter.

Referring to FIG. 4A, the electronic device 100 may provide a menu UI 401 for selecting at least one parameter. In FIG. 4A, it is assumed that a Theme parameter 410 is selected from the menu UI 401 according to a user input.

When the Theme parameter 410 is selected, the electronic device 100 may display an indicator that emphasizes a sub-text (sentence, word, etc.) related to an attribute value (e.g., joyful, suspenseful, disturbed, etc.) of the selected Theme parameter 410.

Here, each sub-text emphasized by the indicator may be matched to attribute information (e.g., joy, suspense, disturbed) related to the Theme parameter 410.

The attribute information represents information about an attribute of each sub-text used when defining an attribute value of an essay related to a specific parameter (e.g., Theme parameter).

In detail, referring to FIG. 4A, indicators 411-1 and 411-2 which emphasize sentences matched to 'joy' (attribute information) may be displayed, and an indicator 412-1 which emphasizes a sentence matched to 'suspense' (attribute information) and an indicator 413-1 which emphasizes a sentence matched to 'disturbed' may be displayed on the text of the essay 302.

Indicators matched to different pieces of attribute information (e.g., joy, suspense, disturbed) may be differentially displayed. In detail, referring to FIG. 4A, indicators respectively matched to 'joy', 'suspense', and 'disturbed' are displayed in different colors.

Furthermore, referring to FIG. 4A, when at least one indicator 411-1 is selected by user manipulation such as a mouse click, touch, or the like, the electronic device 100 may additionally display a wording indicating attribute information ('joy') matched to a sentence emphasized by the indicator 411-1.

Referring to FIG. 4A, the electronic device 100 may provide a variety of evaluation information 410', 410", and 410''' related to an attribute value of the essay 302 for the Theme parameter 410.

The evaluation information 410' is a result of comparing an attribute value intended by a student with an actual attribute of the essay 302, and includes "vs." since the attribute value intended by the student is 'disturbed' but the actual attribute value is 'joy'. However, when the attribute value intended by the student is the same as the actual attribute value, the evaluation information 410' may include "=".

The evaluation information 410" may include a graphic user interface (GUI) that visualizes ratio information of successful applicants for each attribute value related to the selected parameter Theme. Referring to FIG. 4A, a bar-type GUI is displayed according to a ratio of successful applicants corresponding to each attribute value (disturbed, suspenseful, sad, joyful, calm).

Furthermore, referring to FIG. 4A, the evaluation information 410" may include an indicator (intended) indicating a point in the GUI (bar) matched to an attribute value of the essay intended by the student and an indicator (detected) indicating a point in the GUI matched to an attribute value of the essay written by the student.

The evaluation information 410" includes comparison information in which various emotions included in the essay 302 written by the student are compared with various emotions included in essays written by successful applicants. Referring to FIG. 4A, on the left side of the evaluation information 410", frequencies of various emotions (e.g., approval, realization, excitement, admiration, optimism, annoyance) included in the essays of the successful applicants are represented by sizes of circles matched to each of the emotions. Furthermore, on the right side of the evaluation information 410", frequencies of various emotions included in the essay written by the student are represented by sizes of circles matched to each of the emotions.

Meanwhile, although not illustrated, the electronic device 100 may separately provide a text-type evaluation statement including overall contents of the above-mentioned evaluation information 410', 410", and 410'''. In this case, at least one artificial intelligence model for generating a sentence and text according to given evaluation information may be used.

Figure 4B:
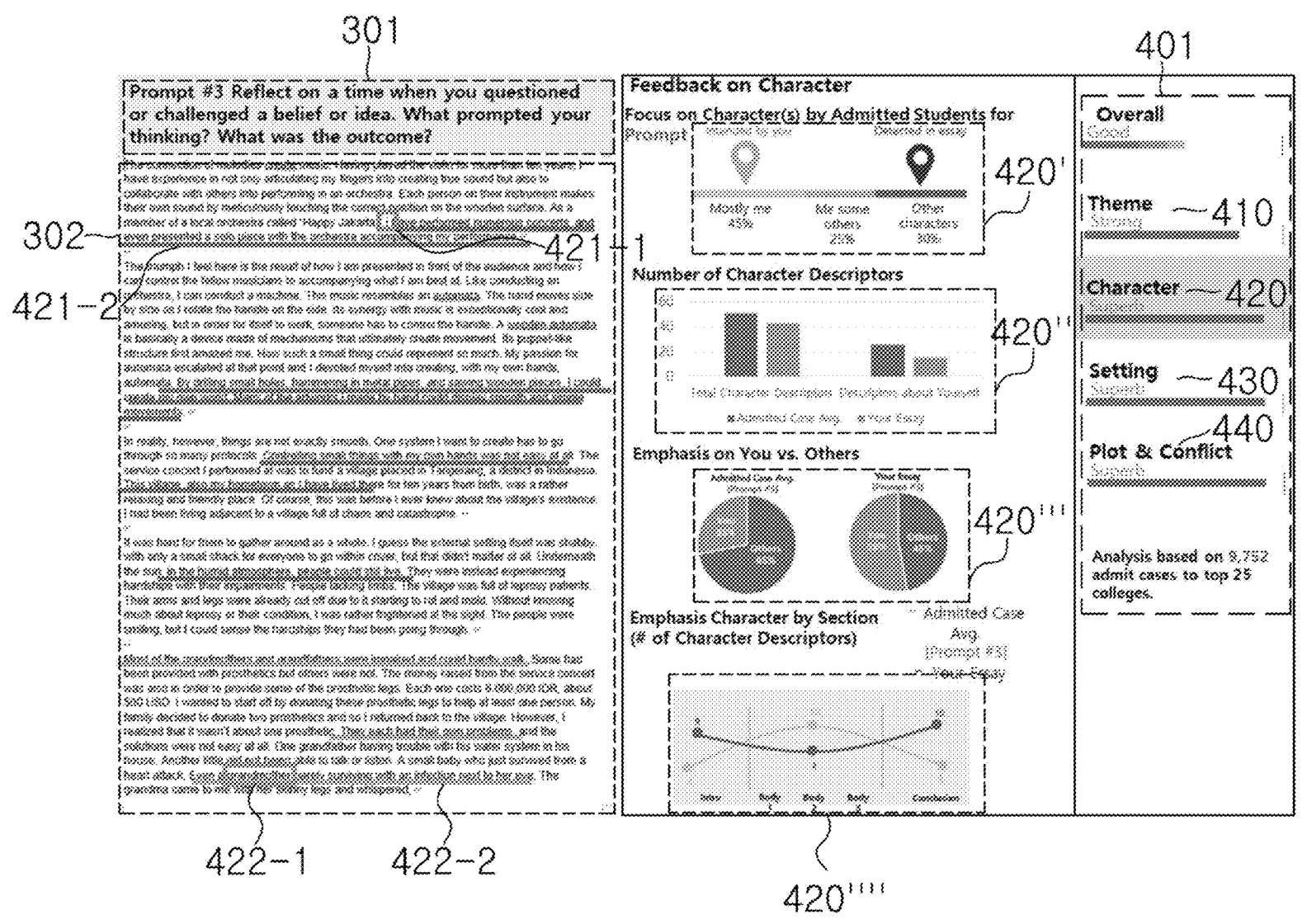

FIG. 4B is a diagram illustrating a UI through which an electronic device according to an embodiment of the present disclosure provides evaluation information about an attribute value of an essay for the Character parameter.

In FIG. 4B, it is assumed that a Character parameter 420 is selected from the menu UI 401 according to a user input.

When the Character parameter 420 is selected, the electronic device 100 may display an indicator that emphasizes a sub-text (sentence, word, etc.) related to each of attribute values (e.g., Mostly me, Me some others, other characters) related to the selected Character parameter 420.

Here, attribute information of each sub-text related to an attribute value of the Character parameter 420 may correspond to 'you', 'others', etc., but is not limited thereto.

In detail, referring to FIG. 4B, the electronic device 100 may display an indicator 421-1 that emphasizes the word "I" (attribute information: you, character indicator) matched to a character corresponding to 'you'. Furthermore, the electronic device 100 may display an indicator 421-2 that emphasizes a sentence (attribute information: you, character descriptor) describing "I".

If the indicator 421-1 is selected according to a user input (mouse click, touch operation, etc.), a wording such as "character (you)" may be displayed according to attribute information matched to "I". If the indicator 422-2 is selected according to a user input, a wording such as "Descriptors about (you)" may be displayed according to attribute information of a sentence.

Furthermore, referring to FIG. 4B, the electronic device 100 may display an indicator 422-1 that emphasizes the word "grandmother" (attribute information: others, character indicator) matched to a character corresponding to 'others'. Furthermore, the electronic device 100 may display an indicator 422-2 that emphasizes a sentence (attribute information: others, character descriptor) describing "grandmother".

Referring to FIG. 4B, the electronic device 100 may provide a variety of evaluation information 420', 420", 420''', 420'''' related to an attribute value of the essay 302 for the Character parameter 420.

The evaluation information 420' may include a GUI (bar) showing a ratio of an attribute value (Mostly me, Me some others, Other characters) of essays of successful applicants with respect to the Character parameter 420.

Furthermore, the evaluation information 420' may include an indicator indicating a point corresponding to an attribute value (intended by you) intended by the student in the GUI and an indicator indicating a point corresponding to an actual attribute value (detected in essay) of the essay written by the student in the GUI.

The evaluation information 420" may include comparison information about a comparison between the number of sentences describing characters in essays of successful applicants and the number of sentences describing characters in the essay written by the student.

In detail, the evaluation information 420" may include graphs respectively showing the number of descriptions about all characters and the number of descriptions about a writer (you) in essays (Admitted Case Avg.) of successful applicants. Furthermore, the evaluation information 420" may include graphs respectively showing the number of descriptions about all characters and the number of descriptions about a writer (you) in the essay (Your Essay) written by the student.

The evaluation information 420''' may include comparison information about an appearance ratio of a writer (you) to all characters in each of the essay (Your Essay) written by the student and the essays (Admitted Case Avg.) of the successful applicants.

When each essay is divided into an introduction (Intro), a body (Body 1, Body 2, Body 3), and a conclusion (Conclusion), the evaluation information 420''' may include a comparison graph that compares and shows the number of characters in each section with respect to each of the essay (Your Essay) written by the student and the essays (Admitted Case Avg.) of the successful applicants.

Figure 4C:
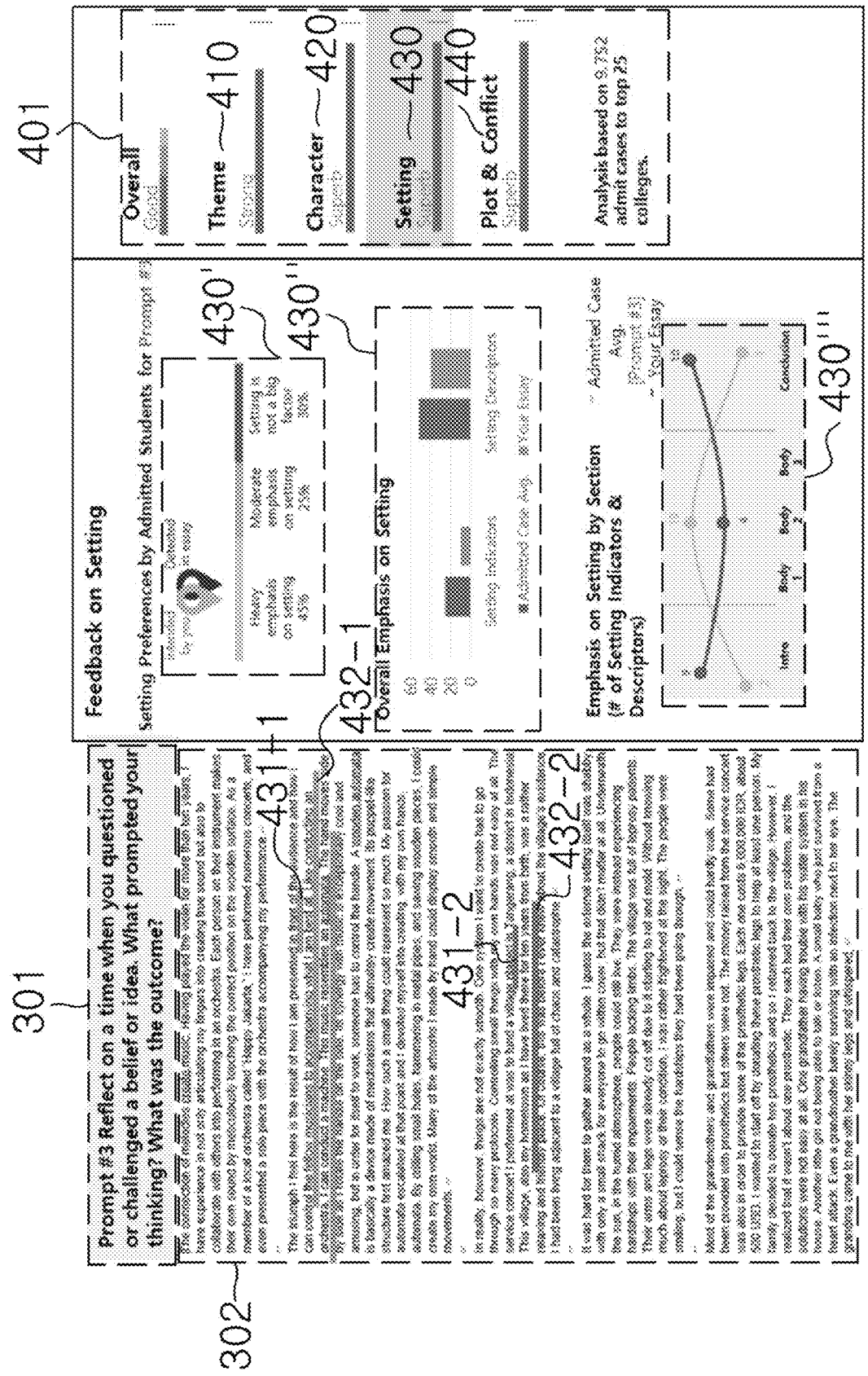
FIG. 4C is a diagram illustrating a UI through which an electronic device according to an embodiment of the present disclosure provides evaluation information about an attribute value of an essay for a Setting parameter.

FIG. 4C is a diagram illustrating a UI through which an electronic device according to an embodiment of the present disclosure provides evaluation information about an attribute value of an essay for the Setting parameter.

In FIG. 4C, it is assumed that a Setting parameter 430 is selected from the menu UI 401 according to a user input.

When the Setting parameter 430 is selected, the electronic device 100 may display an indicator that emphasizes a sub-text (sentence, word, etc.) related to an attribute value (e.g., heavy emphasis on setting, moderate emphasis on setting, setting is not a big factor) of the selected Setting parameter 430.

Here, attribute information of each sub-text may correspond to a setting indicator, a setting descriptor, or the like.

In detail, referring to FIG. 4C, the electronic device 100 may display an indicator 431-1 that emphasizes "in front of" corresponding to the 'setting indicator'. Furthermore, the electronic device 100 may include an indicator 432-1 that emphasizes a sentence corresponding to the 'setting descriptor' for describing a background or the like in more detail.

If the indicator 431-1 is selected according to a user input (mouse click, touch operation, etc.), the wording "setting indicator" may be displayed. If an indicator 432-1 is selected according to a user input, the wording "Setting Descriptor" may be displayed.

Furthermore, referring to FIG. 4C, the electronic device 100 may display an indicator 431-2 that emphasizes "placed in" corresponding to the 'setting indicator'. Furthermore, the electronic device 100 may display an indicator 432-2 that emphasizes a sentence (: my hometown as I have lived there for ten years from birth) corresponding to the 'setting descriptor'.

Referring to FIG. 4C, the electronic device 100 may provide a variety of evaluation information 430', 430", and 430''' related to an attribute value of the essay 302 for the Setting parameter 430.

The evaluation information 430' may include a GUI showing ratio information of essays of successful applicants with respect to attribute values of the Setting parameter 430. Furthermore, the evaluation information 430' may include an indicator (intended by you) indicating a point corresponding to an attribute value intended by the student in the GUI and an indicator (detected in essay) indicating a point corresponding to an attribute value of the essay written by the student in the GUI.

The evaluation information 430" may include comparison information about a comparison between the number of each of 'setting indicators' and 'setting descriptors' in the essays of the successful applicants and the number of each of 'setting indicators' and 'setting descriptors' in the essay written by the student.

In detail, the evaluation information 430" may include graphs respectively showing the number of each of 'setting indicators' and 'setting descriptors' in the essays (Admitted Case Avg.) of the successful applicants. Furthermore, the evaluation information 430" may include graphs respectively showing the number of each of 'setting indicators' and 'setting descriptors' in the essay (Your Essay) written by the student.

When each essay is divided into an introduction (Intro), a body (Body 1, Body 2, Body 3), and a conclusion (Conclusion), the evaluation information 430''' may include a comparison graph that compares and shows strength (e.g., number/frequency of setting indicators/descriptors in section) of the Setting in each section with respect to each of the essay (Your Essay) written by the student and the essays (Admitted Case Avg.) of the successful applicants.

Figure 4D:
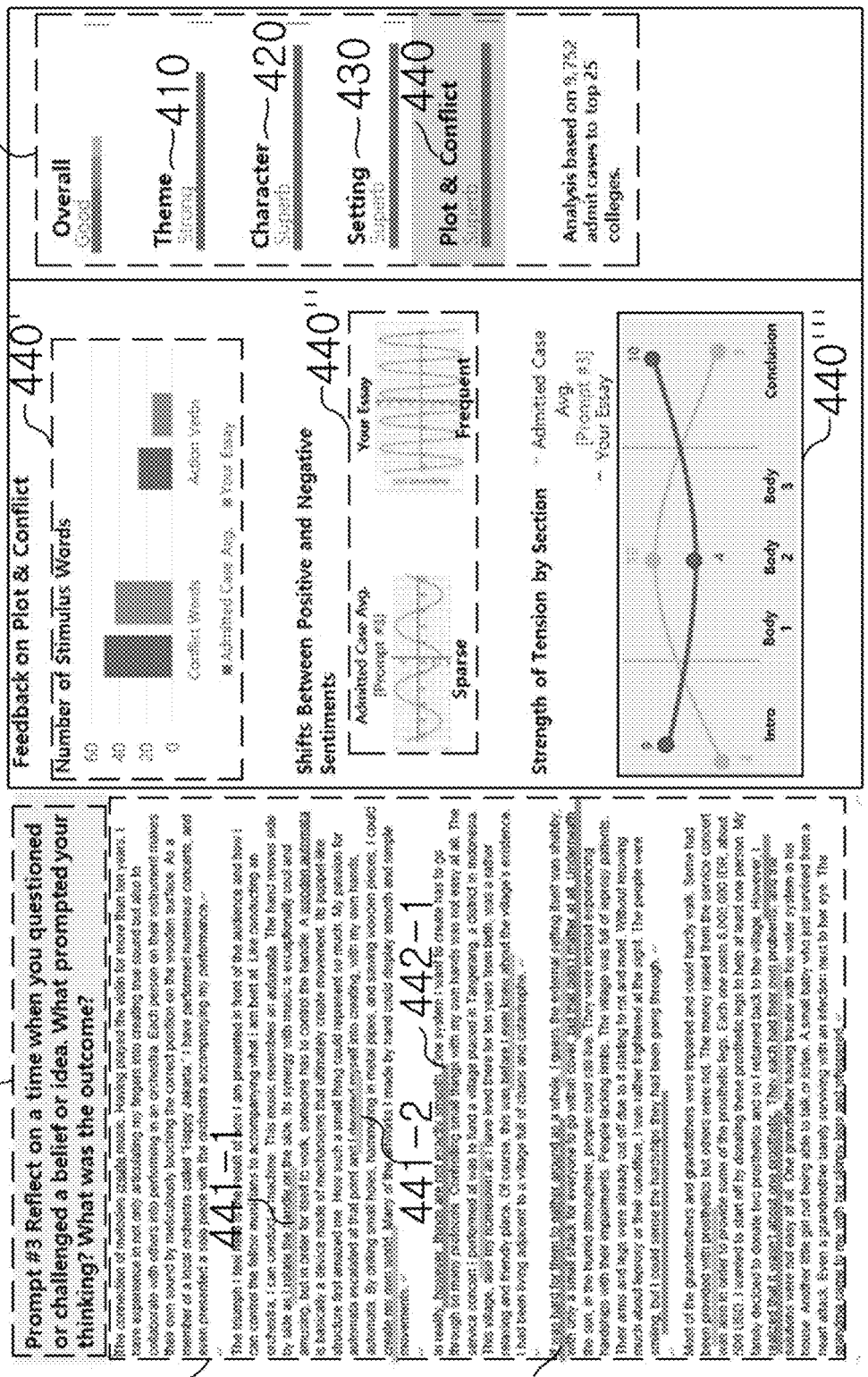
FIG. 4D is a diagram illustrating a UI through which an electronic device according to an embodiment of the present disclosure provides evaluation information about an attribute value of an essay for a Plot & Conflict parameter.

FIG. 4D is a diagram illustrating a UI through which an electronic device according to an embodiment of the present disclosure provides evaluation information about an attribute value of an essay for the Plot & Conflict parameter.

In FIG. 4D, it is assumed that a Plot & Conflict parameter 440 is selected from the menu UI 401 according to a user input.

When the Plot & Conflict parameter 440 is selected, the electronic device 100 may display an indicator that emphasizes a sub-text (sentence, word, etc.) related to an attribute value (e.g., sparse, frequent) of the selected Plot & Conflict parameter 440.

Here, attribute information of each sub-text may correspond to a conflict word, an action verb, a positive sentiment, a negative sentiment, or the like.

In detail, referring to FIG. 4D, the electronic device 100 may display indicators 441-1 and 441-2 that respectively emphasize sub-texts corresponding to the 'action verb'.

Furthermore, the electronic device 100 may display an indicator 442-1 that emphasizes a sub-text (e.g., however) corresponding to the 'conflict word'. Furthermore, the electronic device 100 may display an indicator 442-2 that emphasizes a sub-text corresponding to the 'negative sentiment'.

Referring to FIG. 4D, the electronic device 100 may provide a variety of evaluation information 440', 440", and 440''' related to an attribute value of the essay 302 for the Plot & Conflict parameter 440.

The evaluation information 440' may include comparison information about a comparison between the number of each of 'conflict words' and 'action verbs' in the essays of the successful applicants and the number of each of 'conflict words' and 'action verbs' in the essay written by the student.

In detail, the evaluation information 440' may include graphs respectively showing the number of each of 'conflict words' and 'action verbs' in the essays (Admitted Case Avg.) of the successful applicants. Furthermore, the evaluation information 440' may include graphs respectively showing the number of each of 'conflict words' and 'action verbs' in the essay (Your Essay) written by the student.

The evaluation information 440" may be configured with comparison information including a graph showing a frequency of emotional ups and downs in the essays (Admitted Case Avg.) of the successful applicants and a graph showing a frequency of emotional ups and downs in the essay (Your Essay) written by the student.

When each essay is divided into an introduction (Intro), a body (Body 1, Body 2, Body 3), and a conclusion (Conclusion), the evaluation information 440''' may include a comparison graph that compares and shows strength (e.g., emotional ups and downs in section, or number/frequency of conflict words/action verbs in section) of tension in each section with respect to each of the essay (Your Essay) written by the student and the essays (Admitted Case Avg.) of the successful applicants.

Meanwhile, when "Overall" is selected from the above-mentioned menu UI 401, the electronic device 100 may summarize the variety of evaluation information described above with reference to FIGS. 4A to 4D to provide the variety of evaluation information in an aggregated manner Meanwhile, according to an embodiment, the electronic device 100 may provide a question according to a school and major to be applied for by the student, and may differently generate a parameter for evaluating an essay according to the school and major.

FIG. 5 is a flowchart for describing an operation of an electronic device according to an embodiment of the present disclosure for providing evaluation information of an essay for a plurality of parameters identified according to a school and major to be applied for.

Referring to FIG. 5, the electronic device 100 may receive an input of a school and major to be applied for by a student (S510).

Furthermore, the electronic device 100 may provide a plurality of questions matched to the input school and major (S520). The plurality of questions may be previous questions of a past admission process related to the corresponding school and major.

Furthermore, the electronic device 100 may receive an input of an essay written by the student with regard to at least one of the plurality of provided questions (S530).

Here, the electronic device 100 may identify the type of a question for which the essay has been input, and may identify a plurality of parameters matched to the identified type (S540).

The type of a question may include various types such as "why us" type for asking about an application motivation, "Intellectual interest" type, "Meaningful experience & lesson learned" type, "Achievement" type related to an achievement experience, "contribution & solution" type related to a social activity, "activity" type for asking about an activity during a vacation or season, "unique quality, passion, talent" type, "extracurricular activity or work experience" type, "role and contribution in community" type, "role, involvement, and contribution in college community" type, "Overcoming challenge or ethical dilemma" type, "culture & diversity" type, "collaboration & teamwork" type, "Creativity" type, "Leadership experience" type, "values, perspectives, or beliefs" type, "person who influence you" type about a person who has influenced a student, "favorite book/movie/quote" type, "diversity" type, "future goals" type, and "hobby" type, and may include other various types. Information about the types of questions matched to universities/majors may be stored in advance in the electronic device 100 or at least one server connected to the electronic device 100 so as to be used.

Furthermore, for each of the types of questions, information about a plurality of parameters may be stored in advance so as to be used.

For example, for the "why us" type, parameters such as "College & Department Fit", "Major Fit", and "Prompt Oriented Sentiments" may be pre-set.

For example, for the "intellectual interest" type, parameters such as "Major Fit", "General Knowledge", "Prompt Oriented Sentiments", and "Originality" may be pre-set.

For example, for the "Contribution & solution" type, parameters such as "Social awareness", "prompt oriented sentiments", "initiative, engagement", and contribution", and "Topic Uniqueness" may be pre-set.

Furthermore, the electronic device 100 may obtain evaluation information of an essay written by the student with respect to each of the plurality of parameters identified according to the type of a question (S550).

The evaluation information may include absolute evaluation contents for each parameter of the essay written by the student, and may also include comparison information about a comparison with evaluation contents for each parameter of essays of successful applicants for the university/major to be applied for by the student.

For example, when the type of a question is the "intellectual interest" type, the electronic device 100 may obtain the evaluation information related to the "Originality" parameter by analyzing the essay written by the student.

In detail, the electronic device 100 may extract a plurality of keywords from the text constituting the essay written by the student. Here, the extracted keywords may correspond to pre-stored words related to the 'intellectual interest' or words matched to a vector that is within a certain distance from a vector converted from the 'intellectual interest'.

In this case, the electronic device 100 may convert each of the plurality of extracted keywords into a vector form, and may identify relevance between the plurality of keywords according to a distance between the vectors. In this case, the essay may be interpreted as a relatively one-dimensional essay if the relevance between the keywords is too high, and may be interpreted as a hard-to-understand essay if the relevance between the keywords is too low.

The electronic device 100 may obtain the evaluation information according to the identified relevance. For example, as the relevance between the keywords is closer to a threshold relevance corresponding to an appropriate value, an evaluation score of the essay for the "Originality" parameter calculated by the electronic device 100 may be higher.

Furthermore, for example, when the type of a question is the "Contribution & solution" type, the electronic device 100 may obtain the evaluation information related to the "Topic Uniqueness" parameter by analyzing the essay written by the student.

In detail, the electronic device 100 may extract a plurality of keywords from the text constituting the essay written by the student. Here, the extracted keywords may be keywords having relatively high relevance to words such as 'social', 'issue', 'contribution', 'solution', etc., and may correspond to keywords corresponding to a topic of at least one sentence within the essay.

In this case, the electronic device 100 may search a web for each of the plurality of extracted keywords.

Here, according to a search frequency of each of the plurality of keywords, the electronic device 100 may select at least one unique keyword from among the plurality of keywords. In this case, the electronic device 100 may identify a unique keyword which does not often appear generally but appears in the corresponding essay, using a TF-IDF technique.

Furthermore, the electronic device 100 may obtain the evaluation information based on the frequency of the unique keyword in the essay written by the student. For example, as the frequency of the unique keyword is closer to a certain numerical value that is not too large or too small, a calculated evaluation score may be higher, but an embodiment of the present disclosure is not limited thereto.

When the evaluation information is obtained for each of the plurality of parameters according to the above-mentioned various embodiments, the electronic device 100 may generate feedback text according to the evaluation information obtained for each of the plurality of parameters (S560).

The feedback text may correspond to text generated as a result of summarizing/aggregating the evaluation information for each of the plurality of parameters.

Figure 6:
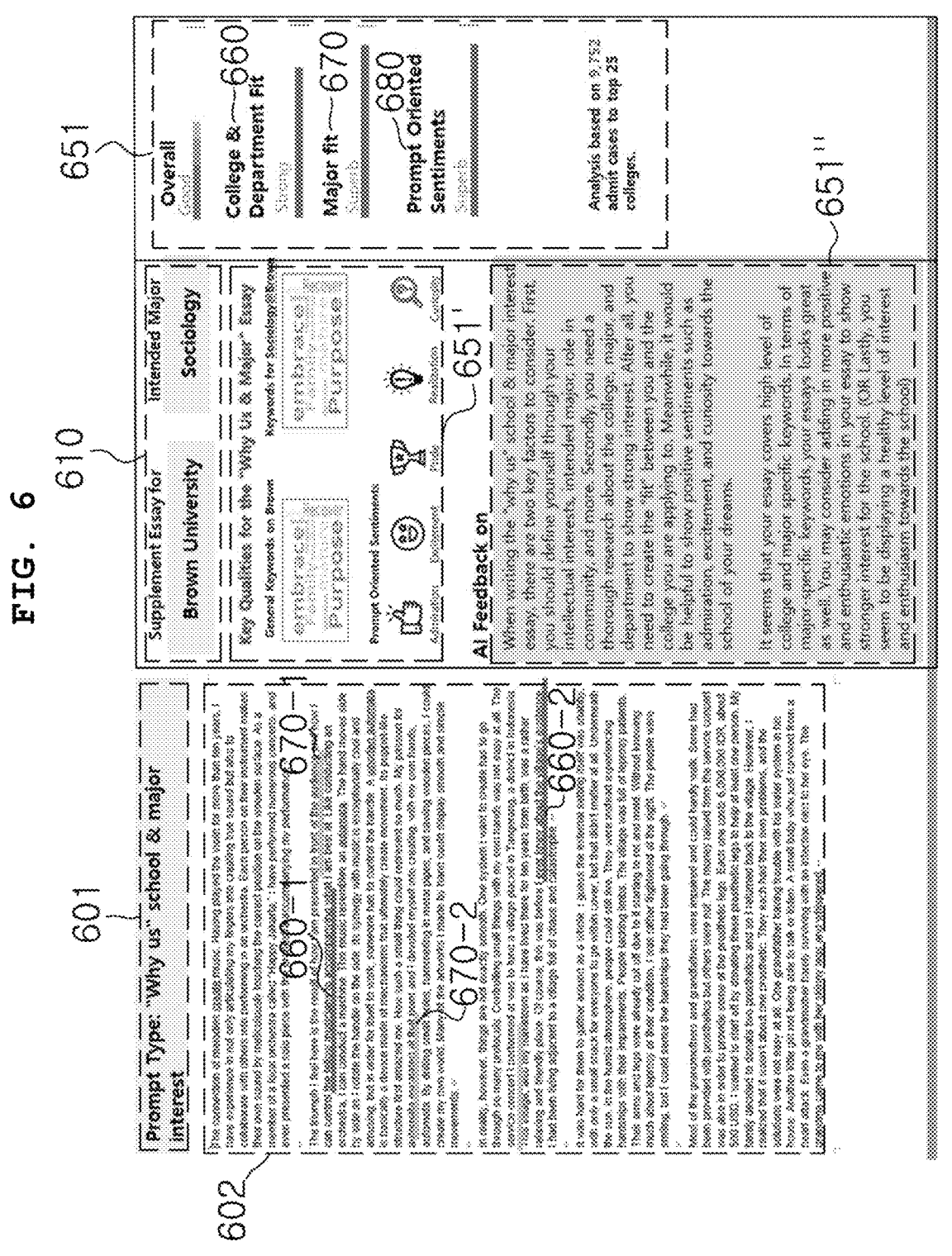

FIG. 6 is a diagram illustrating a UI that an electronic device provides according to the embodiment of FIG. 5.

Referring to FIG. 6, a university and major to be applied for by a student and/or information about the university and major to be applied for by the student may be displayed through a UI 610.

The electronic device 100 may provide a question 601 of a type related to the university and major to be applied for by the student, and may receive an essay 602 written by a user with respect to the question 601.

Referring to FIG. 6, the electronic device 100 may provide a menu UI 651 including a plurality of parameters "College & Department Fit" 660, "Major Fit" 670, "Prompt Oriented Sentiments" 680, etc. matched to the "why us" type that is the type of the question. The Prompt Oriented Sentiments 680 correspond to a parameter representing a degree of expression of an emotion related to the type ('why us') of the question.

In relation to this, the electronic device 100 may provide a UI 651' including information about keywords related to the corresponding school and major and information about emotions related to the type ('why us') of the question. In this case, the student may supplement an essay writing manner while comparing expressions in the essay 602 written by the student with keywords and emotions in the UI 651'.

Referring to FIG. 6, in relation to the College & Department Fit parameter 660, the electronic device 100 may display indicators 660-1 and 660-2 for emphasizing sub-texts related to 'Brown University" that is a university to be applied for. Furthermore, in relation to the Major Fit parameter 670, the electronic device 100 may display indicators 670-1 and 670-2 for emphasizing sub-texts related to 'sociology' that is a major to be applied for.

Here, when at least one of the indicators 660-1 and 660-2 is selected by mouse click, touch, or the like, the electronic device 100 may display a wording such as "College & Dept." that is attribute information. Furthermore, when at least one of the indicators 670-1 and 670-2 is selected by mouse click, touch, or the like, the electronic device 100 may display a wording such as "Major Fit" that is attribute information.

Furthermore, referring to FIG. 6, the electronic device 100 may provide feedback text 651" in which evaluation information about parameters in the menu UI 651 is reflected in an aggregated manner The feedback text 651" may be generated as a result of applying, in an aggregated manner, evaluation information and/or attribute values of the essay 602 identified with respect to each of the parameters 660, 670, and 680. In relation to this, the electronic device 100 may use an artificial intelligence model, which generates at least one sentence by sequentially reflecting the evaluation information and/or attribute values of each parameter.

Meanwhile, the electronic device 100 may be controlled to predict a probability of acceptance according to award information and activity information of the student. Hereinafter, a method for controlling the electronic device 100 to predict the probability of acceptance by comparing the award information and activity information of the student with award information and activity information of successful applicants will be described.

FIG. 7 is a flowchart for describing operation of an electronic device according to an embodiment of the present disclosure.

Referring to FIG. 7, the electronic device 100 may identify a school and major to be applied for according to a user input (S710).

The user input may be received through a user input unit (e.g., touch screen, button, microphone, or camera (motion recognition unit)) included in the electronic device 100. Alternatively, in the case where the electronic device 100 is a server, the user input may be received through at least one terminal device connected to the electronic device 100.

For example, the electronic device 100 may perform member subscription to a platform provided by the electronic device 100 through a process of receiving student information including a name, age, contact number, and the like of a student. In this case, an ID and password linked to the student information may be generated.

Furthermore, in a state in which a particular student has logged in, a school and major to be applied for by the student may be input to the electronic device 100. Alternatively, the school and major to be applied for by the student may be input during a member subscription process.

The electronic device 100 may obtain award information and activity information of the student according to the user input (S720).

The award information represents information about a past award history of the student. The award information may include a name and description of each of award items won by the student in the past.

For example, the name of an award item may correspond to the name of a prize won by the student. Furthermore, the description of an award item may include details about a reason for awarding the prize, a level or grade of the prize, an institution that awarded the prize, date of prize awarding (age/grade of the student at the time of prize awarding), etc., but is not limited thereto.

The activity information represents information about a history of past activities of the student. The activity information may include a name and description of each of activity items performed by the student in the past.

For example, the name of an activity item may correspond to an official name or type of an activity. Furthermore, the description of an activity item may include details about a task performed by the student during activity, a position (e.g., position in task, contribution) of the student during activity, a host institution, a level/grade of activity, a certificate or authorization given to the student as a result of activity, activity time, activity place, etc., but is not limited thereto.

FIG. 8 is a diagram for describing a user interface (UI) that an electronic device provides to receive an input of award information and activity information according to an embodiment of the present disclosure.

Referring to FIG. 8, the electronic device 100 may visually provide a UI 810 for receiving an input of award information of a student for each award item (e.g., Award 1, Award 2, etc.). A name of an award item, a grade at the time of prize awarding, a level of recognition of an award item, etc. may be input through the UI 810.

Furthermore, the electronic device 100 may visually provide a UI 820 for receiving an input of activity information of the student for each activity item (e.g., Activity 1, Activity 2, etc.). A name of an activity item, specific details about activity, details of achievement, an emotion of the student after achievement, a level of activity, time/frequency of activity, etc. may be input through the UI 820.

Meanwhile, the electronic device 100 may collect data pertaining to successful applicants for a school and major to be applied for by the student.

In detail, the electronic device 100 may obtain award information and activity information of various successful applicants for the corresponding major of the corresponding school (S730). Here, the award information and activity information of the successful applicants may include a history of award/activity of the successful applicants prior to the time at which the successful applicants applied for the corresponding major of the corresponding school.

The electronic device 100 may collect only data of the successful students about the school and major to be applied for by the student in a database in which the award information and activity information of successful applicants for various schools and majors are included.

The database may be provided in the electronic device 100 or may be stored in at least one external server capable of communicating with the electronic device 100. The electronic device 100 may also receive data of successful applicants from a server of another company or person cooperating with an operator of the electronic device 100.

Furthermore, the electronic device 100 may determine importance for each award item of the student and importance for each activity item of the student by comparing the award information and activity information of the student with the award information and activity information of the successful applicants (S740).

The importance is an index for generating prediction information about the probability of acceptance of the student, and may be construed as a concept that the probability of acceptance is predicted to be higher as the number of award items and/or activity items having high importance increases.

Figure 9:
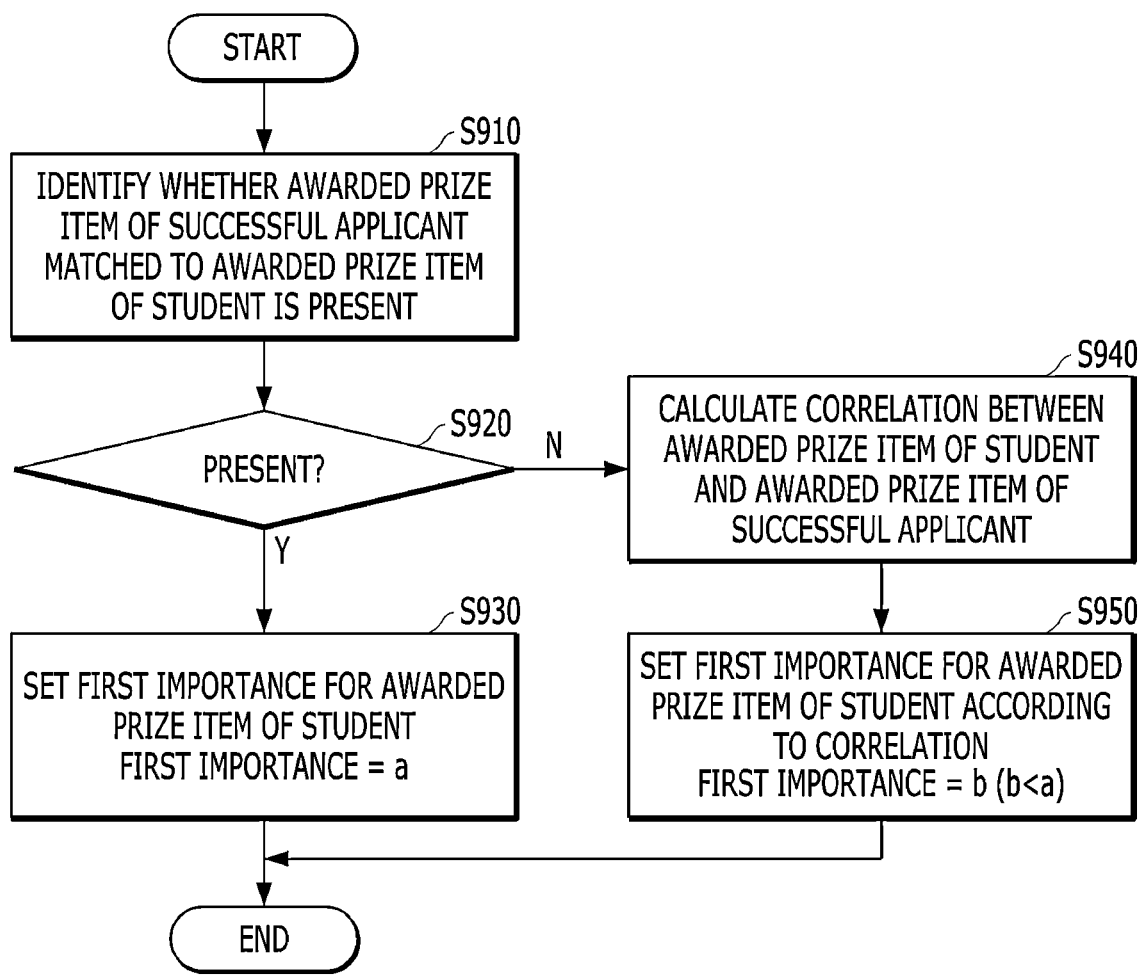
FIG. 9 is a flowchart illustrating an algorithm for an electronic device according to an embodiment of the present disclosure to determine first importance for each award item included in award information.

In relation to this, FIG. 9 is a flowchart illustrating an algorithm for an electronic device according to an embodiment of the present disclosure to determine first importance for each award item included in award information.

Referring to FIG. 9, the electronic device 100 may identify whether an award item of a successful applicant matched to an award item of a student is present (S910).

In detail, the electronic device 100 may compare an award item of the student included in the award information of the student with each of award items of successful applicants included in the award information of the successful applicants.

In this case, the electronic device 100 may compare a name of the award item of the student with a name of each of the award items of the successful applicants, and may compare a description of the award item of the student with a description of each of the award items of the successful applicants.

Here, the electronic device 100 may use a latent Dirichlet allocation (LDA) topic extraction scheme. For example, the electronic device 100 may convert the name of the award item of the student and the name of each of the award items of the successful applicants into a matrix or vector to compare a first topic matched to the name of the award item of the student with a second topic matched to the name of each of the award items of the successful applicants. Likewise, the electronic device 100 may compare the description of the award item of the student with the description of each of the award items of the successful applicants based on a topic.

Here, at least one artificial intelligence model may be used, which is trained according to a topic classified according to at least one of the name, type, or level of an award and trained to select, according to the name and/or description of an input award item, a topic of the award item.

If the award item of the successful applicant matched to the award item of the student is present (S920—Y), the electronic device 100 may set first importance for the award item of the student according to the matched award item of the successful applicant (S930).

To this end, a factor related to importance may be pre-set for each of the award items of the successful applicants. For example, a larger factor may be set for an award item having a higher level or a greater contribution to acceptance among the award items of the successful applicants.

As a result, as the level of the award item of the successful applicant matched to the award item of the student is higher, the first importance of the award item of the student may be set higher.

On the contrary, if the award item of the successful applicant matched to the award item of the student is not present (S920—N), the electronic device 100 may calculate relevance of the award item of the student to the award information of the successful applicant by comparing the award item of the student with each of the award items included in the award information of the successful applicant (S940).

In detail, the electronic device 100 may calculate each relevance by comparing the award item of the student with each of the award items of the successful applicant, wherein the electronic device 100 may identify relevance of the award item of the student to the award item of the successful applicant having highest relevance.

When comparing the award item of the student with each of the award items of the successful applicants, the electronic device 100 may compare the name of the award item of the student with the names of the award items of the successful applicants, and may compare the description of the award item of the student with the description of the award items of the successful applicants.

In detail, the electronic device 100 may calculate first relevance by comparing the name of the award item of the student with the name of each of the award items of the successful applicants using a TF-IDF scheme, and may calculate second relevance by comparing the description of the award item of the student with the description of each of the award items of the successful applicants using a TF-IDF scheme. Here, the relevance may be defined according to a frequency of keywords included in text (name/description) constituting each of award items.

In this case, the electronic device 100 may calculate the relevance of the award item of the student to the award items of the successful applicants based on a larger value among the first relevance and the second relevance.

As described, a dualized detailed analysis scheme is established by individually comparing the names and descriptions, thus making it possible to calculate specific relevance.

Furthermore, the electronic device 100 may set the first importance of the award item of the student according to the relevance of the award item of the student to the award item of the successful applicant having highest relevance (S950).

In this case, the first importance may be set lower (b<a) than that of the case where the award item of the successful applicant matched to the award item of the student is present (S930), but is not necessarily limited thereto.

For example, when the level of the award item of the successful applicants having highest relevance to a first award item of the student is very high, and the level of the award item of the successful applicants matched to a second award item of the student is relatively low, the importance of the second award item matched to none of the award items of the successful applicants may be calculated to be higher than the importance of the first award item.

Figure 10:
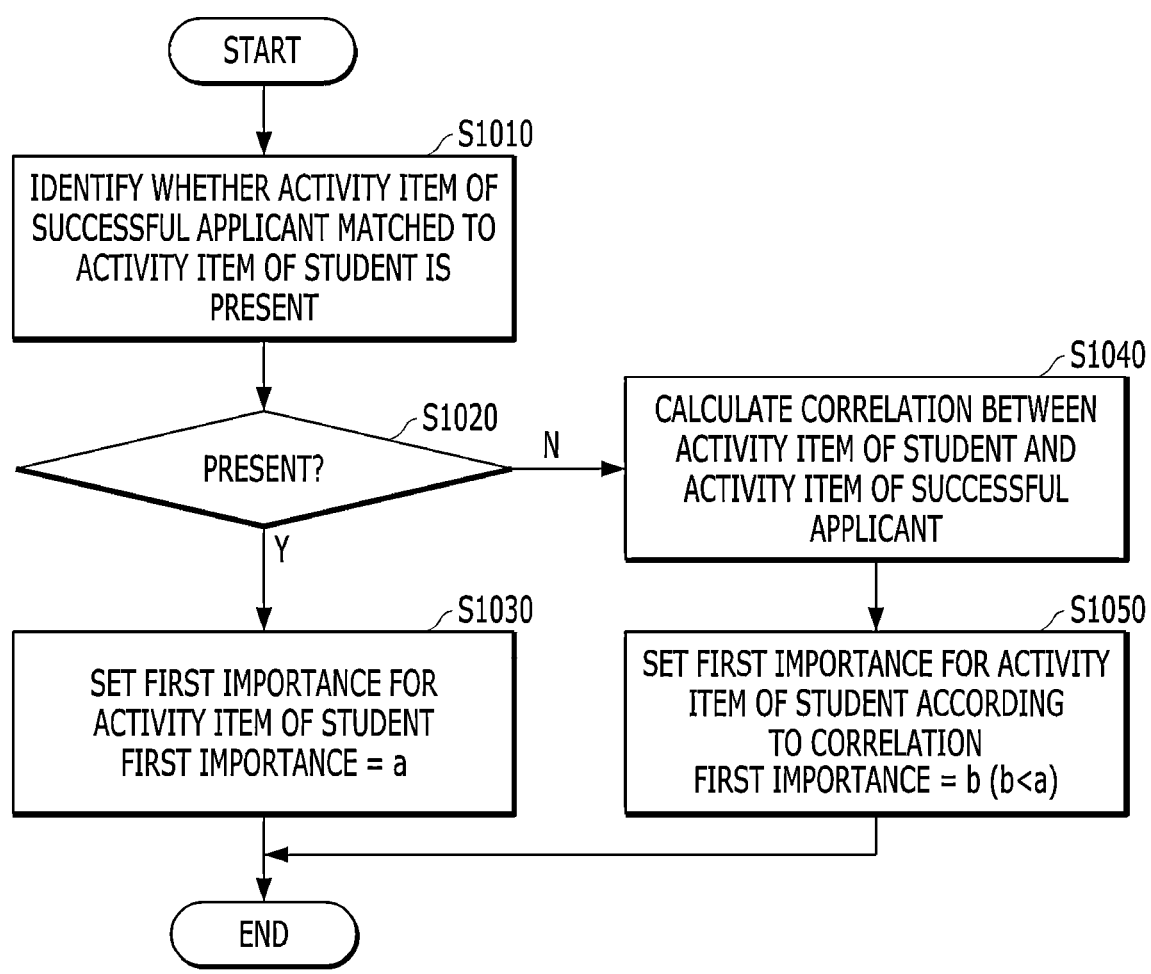
FIG. 10 is a flowchart illustrating an algorithm for an electronic device according to an embodiment of the present disclosure to determine first importance for each activity item included in activity information.

FIG. 10 is a flowchart illustrating an algorithm for an electronic device according to an embodiment of the present disclosure to determine first importance for each activity item included in activity information.

Referring to FIG. 10, the electronic device 100 may identify whether an activity item of a successful applicant matched to an activity item of a student is present (S1010).

In detail, the electronic device 100 may compare an activity item of the student included in the activity information of the student with each of activity items of successful applicants included in the activity information of the successful applicants.

In this case, the electronic device 100 may compare a name of the activity item of the student with a name of each of the activity items of the successful applicants, and may compare a description of the activity item of the student with a description of each of the activity items of the successful applicants.

Here, the electronic device 100 may use a latent Dirichlet allocation (LDA) topic extraction scheme. Here, at least one artificial intelligence model may be used, which is trained according to a topic classified according to at least one of the name, type, or level of activity and trained to select, according to the name and/or description of an input activity item, a topic of the activity item.

If the activity item of the successful applicant matched to the activity item of the student is present (S1020—Y), the electronic device 100 may set first importance for the activity item of the student according to the matched activity item of the successful applicant (S1030).

To this end, a factor related to importance may be pre-set for each of the activity items of the successful applicants. For example, a larger factor may be set for an activity item having a higher level or a greater contribution to acceptance among the activity items of the successful applicants.

As a result, as the level of the activity item of the successful applicant matched to the activity item of the student is higher, the first importance of the activity item of the student may be set higher.

On the contrary, if the activity item of the successful applicant matched to the activity item of the student is not present (S1020—N), the electronic device 100 may calculate relevance of the activity item of the student to the activity information of the successful applicant by comparing the activity item of the student with each of the activity items included in the activity information of the successful applicant (S1040).

In detail, the electronic device 100 may calculate each relevance by comparing the activity item of the student with each of the activity items of the successful applicant, wherein the electronic device 100 may identify relevance of the activity item of the student to the activity item of the successful applicant having highest relevance.

When comparing the activity item of the student with each of the activity items of the successful applicants, the electronic device 100 may compare the name of the activity item of the student with the names of the activity items of the successful applicants, and may compare the description of the activity item of the student with the description of the activity items of the successful applicants.

In detail, the electronic device 100 may calculate third relevance by comparing the name of the activity item of the student with the name of each of the activity items of the successful applicants using a TF-IDF scheme, and may calculate fourth relevance by comparing the description of the activity item of the student with the description of each of the activity items of the successful applicants using a TF-IDF scheme.

In this case, the electronic device 100 may calculate the relevance of the activity item of the student to the activity items of the successful applicants based on a larger value among the third relevance and the fourth relevance.

Furthermore, the electronic device 100 may set the first importance of the activity item of the student according to the relevance of the activity item of the student to the activity item of the successful applicant having highest relevance (S1050). In this case, the first importance may be set lower (b<a) than that of the case where the activity item of the successful applicant matched to the activity item of the student is present (S1030), but is not necessarily limited thereto.

Meanwhile, according to an embodiment, the electronic device 100 may calculate second importance by analyzing each of the award items of the student and calculate second importance by analyzing each of the activity items of the student.

In detail, the electronic device 100 may set the second importance according to a prestige score and a major fit score for each of the award items of the student, and may set the second importance according to a dedication score, a leadership score, a description score, and a major fit score for each of the activity items of the student.

Figure 11:
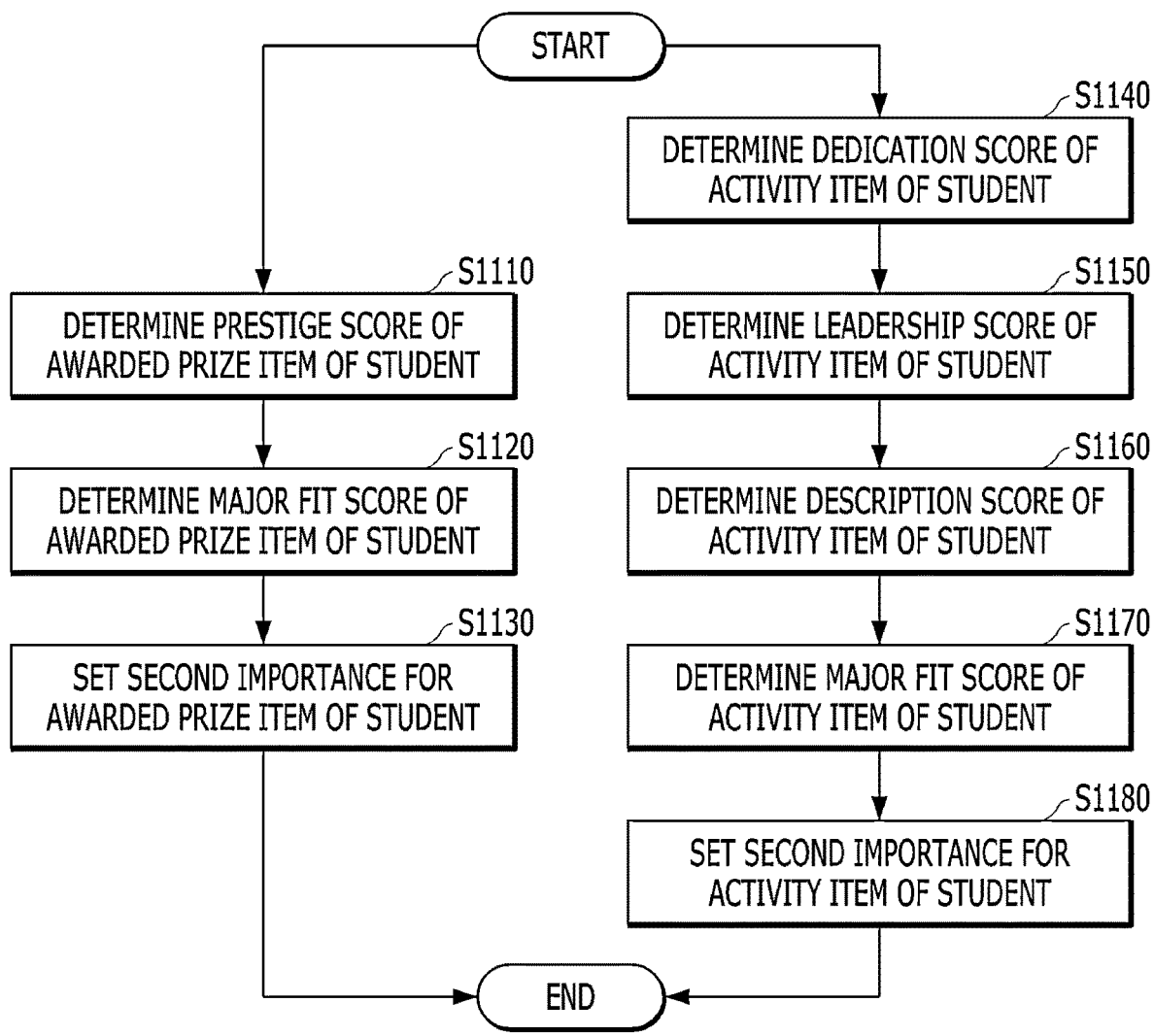
FIG. 11 is a flowchart illustrating an algorithm for an electronic device according to an embodiment of the present disclosure to determine second importance for each of an award item and an activity item.

In relation to this, FIG. 11 is a flowchart illustrating an algorithm for an electronic device according to an embodiment of the present disclosure to determine second importance for each of an award item and an activity item.

Referring to FIG. 11, the electronic device 100 may determine a prestige score of an award item of a student (S1110).

The prestige represents a level or grade according to a class or position (e.g., gold, silver) of the award item.

For example, the electronic device 100 may obtain the prestige score of the award item of the student using data obtained by classifying, in advance, a plurality of award items by level or grade.

Furthermore, the electronic device 100 may determine a major fit score of the award item of the student (S1120).

The major fit represents suitability of the award item for a major to be applied for by the student.

For example, the electronic device 100 may identify at least one keyword associated with the major to be applied for by the student. Furthermore, the electronic device 100 may obtain the major fit score of the award item of the student based on a frequency of appearance of the identified keyword in the name or description of the award item of the student.

Furthermore, the electronic device 100 may set, for the award item of the student, second importance in which the above-mentioned prestige score and major fit score are applied (S1130). For example, the electronic device 100 may calculate the second importance by adding up all of the corresponding scores, but an embodiment of the present disclosure is not limited thereto.

As a result of performing the above-mentioned operations S1110 to S1130 for each award item of the student, the second importance may be set for each award item.

Here, the electronic device 100 may provide the prestige score, major fit score, and second importance calculated for each award item to a user (student). For example, the electronic device 100 may visually provide the prestige score, major fit score, and second importance for each award item through a display of the electronic device 100 or through a display of at least one terminal device (e.g., smartphone of student) connected to the electronic device 100.

Meanwhile, referring to FIG. 11, the electronic device 100 may determine a dedication score of an activity item of the student (S1140).

The dedication may represent time invested by the student to perform the activity item. For example, the electronic device 100 may obtain the dedication score of the activity item by comparing the time invested by the student for the corresponding activity with the time invested by a successful applicant for at least one activity item. For example, as the time invested by the student is longer, the dedication score may be higher. However, the dedication score may not be increased any more when the time exceeds a threshold time (e.g., two times an average investment time of successful applicants).

Furthermore, the electronic device 100 may determine a leadership score of the activity item of the student (S1150).

The leadership represents a leadership position of the student, which is established according to a position (status, contribution) taken on by the student while performing the activity item.

For example, the electronic device 100 may obtain the leadership score according to a frequency of appearance of words (e.g., leadership-related lexicon, action verb) related to leadership and/or words related to engagement in the description of the activity item, but an embodiment of the present disclosure is not limited thereto.

Furthermore, the electronic device 100 may determine a description score of the activity item of the student (S1160).

The description corresponds to an index for evaluating whether contents have been thoroughly written.

For example, the electronic device 100 may obtain the description score according to a total number of words included in the description of the activity item, the number/frequency of words corresponding to active verbs, the number/frequency of words related to leadership, etc.

Furthermore, the electronic device 100 may determine a major fit score of the activity item of the student (S1170).

The major fit represents suitability of the activity item for a major to be applied for by the student.

For example, the electronic device 100 may obtain the major fit score of the activity item of the student based on a frequency of appearance of keywords related to the major to be applied for in the name or description of the activity item of the student.

Furthermore, the electronic device 100 may set, for the activity item of the student, second importance in which the above-mentioned dedication score, leadership score, description score, and major fit score are applied (S1180). For example, the electronic device 100 may calculate the second importance by adding up all of the corresponding scores, but an embodiment of the present disclosure is not limited thereto.

As a result of performing the above-mentioned operations S1140 to S1180 for each activity item of the student, the second importance may be set for each activity item.

Here, the electronic device 100 may provide the dedication score, leadership score, description score, major fit score, and second importance calculated for each activity item to the user (student). For example, the electronic device 100 may visually provide the dedication score, leadership score, description score, major fit score, and second importance for each activity item through a display of the electronic device 100 or through a display of at least one terminal device (e.g., smartphone of student) connected to the electronic device 100.

When the first importance and the second importance are determined for each award item and each activity item according to the above-mentioned various embodiments, the electronic device 100 may determine importance for each award item and each activity item using at least one of the first importance or the second importance.

In detail, the electronic device 100 may determine importance for each award item of the student based on the first importance and second importance set for each award item of the student. For example, the electronic device 100 may determine the importance for each award item by adding up the first importance and second importance for each award item, but an embodiment of the present disclosure is not limited thereto.

Likewise, the electronic device 100 may determine importance for each activity item of the student based on the first importance and second importance set for each activity item of the student.

Furthermore, the electronic device 100 may use the importance for each award item of the student and the importance for each activity item of the student to generate prediction information related to acceptance of the student for a school and major to be applied for.

The prediction information may include information about a likelihood of acceptance of the student, the number/type/level of award items/activity items, which are additionally required for acceptance, etc.

For example, the electronic device 100 may obtain an importance sum by adding the importance for each award item and the importance for each activity item of the student. Furthermore, the electronic device 100 may also obtain the importance sum for each of successful applicants of a university and major to be applied for by the student.

Here, the electronic device 100 may provide the probability of acceptance by comparing the importance sum of the student with an average of importance sums of the successful applicants.

Furthermore, the electronic device 100 may identify a relative position (e.g., rank, ratio) of the student among applicants by comparing the importance sum of the student with importance sums of other students (competitors) who desire to apply for the same university and major, and may provide the probability of acceptance by comparing the identified position of the student with an acceptance quota of the corresponding major.

At least two of the above-mentioned various embodiments may be implemented together unless they conflict with each other.

The above-mentioned various embodiments may be implemented in a recording medium readable by a computer or the like using software, hardware or a combination thereof.

For implementation with hardware, the embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electric units for executing functions.

In some cases, the embodiments described herein may be implemented as a processor itself. For implementation with software, the procedures or functions described herein may be implemented as additional software modules. Each of the above software modules may perform at least one function or operation described herein.

Computer instructions for performing processing operations of a server or terminal according to the various embodiments of the present disclosure may be stored on a non-transitory computer-readable medium. The computer instructions stored on a non-transitory computer-readable medium, when executed by a processor of a specific apparatus, cause the above apparatus to perform the processing operations of the electronic device according to the various embodiments.

The non-transitory computer-readable medium represents a medium which is not a medium for storing data instantaneously, such as a register, a cache, memory, or the like, but an apparatus-readable medium for storing data semi-permanently. In detail, the above-mentioned various applications or programs may be stored on a non-transitory computer-readable medium such as CD, DVD, hard disk, Blu-ray disk, USB, memory card, ROM, etc. so as to be provided.

The control method of an electronic device according to the present disclosure may provide evaluation information about an attribute value for each of various parameters with respect to an essay written by a student.

The control method of an electronic device according to the present disclosure provides evaluation information by comparing, for each parameter, an attribute value of an essay written by a student with attribute values of essays written by successful applicants and an attribute value intended by the student.

Furthermore, the control method of an electronic device according to the present disclosure may provide intuitive feedback for parts in an essay written by a student by providing an indicator that emphasizes a sub-text related to an attribute value for each parameter in the essay written by the student.

Furthermore, the control method of an electronic device according to the present disclosure may predict the probability of acceptance by comparing importance for each of an award item and an activity item with data of successful applicants.

In particular, the control method of an electronic device according to the present disclosure dualistically analyzes a name and description of each award item/activity item to identify whether the name and description match data of successful applicants and identify relevance to the data of the successful applicants, and thus may provide an analysis result in which a result of in-depth comparison analysis with the data of the successful applicants is reflected.

Although the embodiments of the present invention have been described, it is understood that the present invention should not be limited to the above specific embodiments but various modifications can be made by those skilled in the art within the scope of the present invention as defined in the claims, and those modifications should not be interpreted separately from the technical spirit or prospect of the present invention.

What is claimed is:

1. A control method of an electronic device, comprising:
receiving an essay written by a student with respect to at least one question as input;
identifying an attribute value of the essay for each parameter of a plurality of parameters by analyzing text constituting the essay; and
displaying the text constituting the essay and displaying an indicator that emphasizes at least one sub-text related to the attribute value of the essay for each parameter of the plurality of parameters within the displayed text,
wherein the plurality of parameters comprises:
a first parameter has a first attribute value identifying a mood or an emotion of the essay, wherein the first attribute value is generated by:
extracting, from the essay, keywords related to the mood or the emotion, by using an artificial intelligence model that is trained to classify the mood or the emotion; and
identifying the mood or the emotion of the essay by analyzing a frequency of each keyword of the extracted keywords;
a second parameter has a second attribute value pertaining to characters appearing in the essay, wherein the second attribute value is generated by:
extracting, from the essay, keywords related to characters, by using the artificial intelligence model that is trained to extract the keyword related to the characters and identify a character represented in a word; and
determining the second attribute value correspondingly to frequencies of appearances of characters; and
a third parameter has a third attribute value pertaining to at least one of a location, a time, a movement described in the essay, wherein the third attribute value is generated by:
extracting, from the essay, keywords related to the at least one of the location, the time, the movement, by using the artificial intelligence model that is trained to extract the keywords related to the at least one of the location, the time, the movement based on a neural network model;
determining strength of the keywords related to the at least one of the location, the time, the movement;
calculating an average value of the strength of the keywords related to the at least one of the location, the time, the movement; and
determining the calculated average value as the third attribute value.

2. The control method of claim 1, wherein in the displaying of the indicator, when at least one parameter is selected, the indicator that emphasizes a sub-text related to an attribute value of the selected parameter is displayed.

3. The control method of claim 2, further comprising displaying, when the indicator is selected, attribute information of the sub-text related to the attribute value of the selected parameter.

4. The control method of claim 1, wherein in the displaying of the indicator, a plurality of indicators that respectively emphasize a plurality of sub-texts are differentially displayed according to attribute information.

5. The control method of claim 1, further comprising:
receiving a school and major to be applied for by the student as input;
analyzing an essay of each of successful applicants for the major of the school to identify an attribute value for each parameter with respect to the essay of each of the successful applicants;
displaying, when at least one parameter is selected, a graphic user interface (GUI) that visualizes ratio information of the successful applicants with respect to each attribute value related to the selected parameter; and
displaying, in the GUI, an indicator indicating a point matched to the attribute value of the essay written by the student.

6. The control method of claim 5, further comprising:
receiving an attribute value for each parameter intended by the student with respect to the essay as input;
displaying, in the GUI, an indicator indicating a point matched to the attribute value intended by the student; and
displaying comparison information about a comparison between the attribute value of the essay written by the student and the attribute value intended by the student.

7. A control method of an electronic device, comprising:
receiving a school and major to be applied for by a student as input;
providing a plurality of questions matched to the major of the school;
receiving an essay written by the student with respect to at least question among the plurality of questions as input;
identifying a type of the at least one question and identifying a plurality of parameters matched to the identified type;
obtaining evaluation information of the essay written by the student with respect to each of the plurality of parameters identified; and
generating feedback text according to the evaluation information obtained for each of the plurality of parameters,
wherein the identifying the plurality of parameters comprises:
identifying a first parameter that has a first attribute value identifying a mood or an emotion of the essay, wherein the first attribute value is generated by:
extracting, from the essay, keywords related to the mood or the emotion, by using an artificial intelligence model that is trained to classify the mood or the emotion; and
identifying the mood or the emotion of the essay by analyzing a frequency of each keyword of the extracted keywords;
identifying a second parameter that has a second attribute value pertaining to characters appearing in the essay, wherein the second attribute value is generated by:
extracting, from the essay, keywords related to characters, by using the artificial intelligence model that is trained to extract the keyword related to the characters and identify a character represented in a word; and
determining the second attribute value correspondingly to frequencies of appearances of characters; and
identifying a third parameter that has a third attribute value pertaining to at least one of a location, a time, a movement described in the essay, wherein the third attribute value is generated by:
extracting, from the essay, keywords related to the at least one of the location, the time, the movement, by using the artificial intelligence model that is trained to extract the keywords related to the at least one of the location, the time, the movement;
determining strength of the keywords related to the at least one of the location, the time, the movement;
calculating an average value of the strength of the keywords related to the at least one of the location, the time, the movement; and
determining the calculated average value as the third attribute value.

8. The control method of claim 7, wherein the obtaining of the evaluation information of the essay written by the student comprises:
extracting a plurality of keywords from text constituting the essay written by the student;
converting each of the plurality of keywords into a vector form and identifying relevance between the plurality of keywords according to a distance between converted vectors; and
obtaining the evaluation information about an originality parameter according to the identified relevance.

9. The control method of claim 7, wherein the obtaining of the evaluation information of the essay written by the student comprises:
extracting a plurality of keywords from text constituting the essay written by the student;
performing a search from a web with respect to each of the plurality of keywords;
selecting at least one unique keyword from among the plurality of keywords according to a search frequency of each of the plurality of keywords; and
obtaining the evaluation information about a topic uniqueness parameter based on a frequency of appearance of the unique keyword in the essay written by the student.

10. A control method of an electronic device for predicting a probability of acceptance according to award information and activity information, comprising:
identifying a school and major to be applied for according to a user input;
obtaining award information and activity information of a student according to the user input;
obtaining award information and activity information of successful applicants for the major of the school; and
determining, by using an artificial intelligence model, importance for each award item of the student and importance for each activity item of the student by comparing the award information and activity information of the student with the award information and activity information of the successful applicants,
wherein the determining the importance comprises:
when an award item of the successful applicants matched to the award item of the student is present, determining the importance based on pre-set factors of the award item, which are set based on a level of a successful applicant or a contribution amount of the successful applicant; and
when the award item of the successful applicants matched to the award item of the student is not present, determining the importance by:
calculating a first relevance by comparing a name of the award item of the student with a name of each of the award items of the successful applicants;
calculating a second relevance by comparing a description of the award item of the student with a description of each of the award items of the successful applicants; and
setting the importance based on the first relevance and the second relevance.

11. The control method of claim 10, wherein the determining of the importance comprises:
identifying whether an award item of the successful applicants matched to the award item of the student is present by comparing the award item of the student included in the award information of the student with each of award items included in the award information of the successful applicants;
setting first importance of the award item of the student based on whether the award item of the successful applicants matched to the award item of the student is present;
identifying whether an activity item of the successful applicants matched to the activity item of the student is present by comparing the activity item of the student included in the activity information of the student with each of activity items included in the activity information of the successful applicants; and setting first importance of the activity item of the student based on whether the activity item of the successful applicants matched to the activity item of the student is present.

12. The control method of claim 11,
wherein in the identifying whether the award item of the successful applicants matched to the award item of the student is present,
a name of the award item of the student is compared with a name of each of the award items of the successful applicants using a latent Dirichlet allocation (LDA) topic extraction scheme, and
a description of the award item of the student is compared with a description of each of the award items of the successful applicants using the LDA topic extraction scheme,
and in the identifying whether the activity item of the successful applicants matched to the activity item of the student is present,
a name of the activity item of the student is compared with a name of each of the activity items of the successful applicants using the LDA topic extraction scheme, and
a description of the activity item of the student is compared with a description of each of the activity items of the successful applicants using the LDA topic extraction scheme.

13. The control method of claim 11, wherein the determining of the importance comprises:
calculating relevance of the award item of the student to the award information of the successful applicants by comparing the award item of the student with each of the award items included in the award information of the successful applicants when the award item of the successful applicants matched to the award item of the student is not present; and
setting the first importance of the award item of the student according to the relevance of the award item of the student.

14. The control method of claim 13, wherein in the calculating of the relevance of the award item of the student, the relevance of the award item of the student is calculated based on a larger value among the first relevance and the second relevance.

15. The control method of claim 11, wherein the determining of the importance comprises:
calculating relevance of the activity item of the student to the activity information of the successful applicants by comparing the activity item of the student with each of the activity items included in the activity information of the successful applicants when the activity item of the successful applicants matched to the activity item of the student is not present; and
setting the first importance of the activity item of the student according to the relevance of the activity item of the student.

16. The control method of claim 15, wherein in the calculating of the relevance of the activity item of the student,
third relevance is calculated by comparing a name of the activity item of the student with a name of each of the activity items of the successful applicants using a TF-IDF scheme,
fourth relevance is calculated by comparing a description of the activity item of the student with a description of each of the activity items of the successful applicants using the TF-IDF scheme, and
the relevance of the activity item of the student is calculated based on a larger value among the third relevance and the fourth relevance.

17. The control method of claim 11, wherein the determining of the importance comprises:
setting second importance according to a prestige score and a major fit score for each award item of the student; and
setting second importance according to a dedication score, a leadership score, a description score, and a major fit score for each activity item of the student.

18. The control method of claim 17,
wherein in the determining of the importance,
the importance for each award item of the student is determined based on the first importance and the second importance set for each award item of the student, and
the importance for each activity item of the student is determined based on the first importance and the second importance set for each activity item of the student, and
wherein the control method further comprises generating prediction information related to acceptance of the student for the major of the school using the importance for each award item of the student and the importance for each activity item of the student.

* * * * *